(12) United States Patent (10) Patent No.: US 10,292,238 B1
Lombardi et al. (45) Date of Patent: May 14, 2019

(54) SYSTEM AND METHOD FOR THREE-WAY SWITCHING

(71) Applicant: Google LLC, Mountain View, CA (US)

(72) Inventors: Michael J. Lombardi, Lake Zurich, IL (US); Mitchell Hodges, Plainfield, IL (US); Sajid Dalvi, Aurora, IL (US); Joe Allore, Mundelein, IL (US); Krzysztof Szot, Carol Stream, IL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/119,219

(22) Filed: Aug. 31, 2018

(51) Int. Cl.
*H05B 37/02* (2006.01)
(52) U.S. Cl.
CPC ............................ *H05B 37/0209* (2013.01)
(58) Field of Classification Search
CPC ... H05B 37/02; H05B 37/0209; H05B 37/029
See application file for complete search history.

(56) References Cited

U.S. PATENT DOCUMENTS

| | | | | |
|---|---|---|---|---|
| 7,649,727 B2 * | 1/2010 | Elberbaum | ............ | H01H 9/167 361/170 |
| 9,219,358 B2 * | 12/2015 | Elberbaum | ............... | H02G 3/18 |
| 10,123,398 B2 * | 11/2018 | Lark, Jr. | ............ | H05B 37/0272 |
| 2008/0024074 A1 | 1/2008 | Mosebrook et al. | | |
| 2008/0210465 A1 * | 9/2008 | Fitch | ......................... | H02G 3/00 174/481 |
| 2010/0176661 A1 * | 7/2010 | Wilson | ............... | H05B 37/0263 307/114 |
| 2010/0278537 A1 * | 11/2010 | Elberbaum | ............ | G08C 23/06 398/112 |
| 2011/0141647 A1 * | 6/2011 | Garcia | ................. | H01H 23/145 361/166 |
| 2012/0262006 A1 * | 10/2012 | Elberbaum | .............. | H02G 3/12 307/112 |
| 2015/0349567 A1 * | 12/2015 | Weightman | ............ | H05B 37/02 307/52 |
| 2016/0012989 A1 * | 1/2016 | Wilson | .................. | H05B 37/02 200/42.01 |

* cited by examiner

*Primary Examiner* — Jason Crawford
(74) *Attorney, Agent, or Firm* — Morris & Kamlay LLP

(57) ABSTRACT

A method of controlling an electrical control system, the system including a switch module to control power delivery from a power source to at least one load, the switch module including first and second traveler lines to connect the switch module to a load or to a corresponding switch in a three-way configuration, the method including receiving, at the switch module, a first signal from the first traveler line, receiving, at the switch module, a second signal from the second traveler line, receiving, at the switch module, a third signal from a common line, where the common line is connected to the load or the power source, identifying a waveform pattern based on the first signal, second signal and third signal, determining a state of the load based on the identified waveform pattern, and controlling a display of a user interface based on the determined state of the load.

18 Claims, 20 Drawing Sheets

SYSTEM AND METHOD FOR THREE-WAY SWITCHING

BACKGROUND

It will be appreciated that this Background section represents the observations of the inventors, which are provided simply as a research guide to the reader. As such, nothing in this Background section is intended to represent, or to fully describe, prior art.

Lighting controls remain one of the most common devices in the world. They are in nearly every country, in most homes and rooms. In addition to widespread use, the appearance and functionality of the basic light switch remains virtually identical to what was provided in the original disclosure of the toggle light switch in 1917. However, newer functions like dimming, motion-based activation and programmed lighting schedules have been implemented in various forms. Companies have also integrated modern connectivity solutions into the standard light switch, allowing it to be controlled remotely via smartphone or other electronic device.

Multi-way lighting systems utilize more than one switch to control the load. This can be a simple installation of a "three-way switch," which uses two corresponding control switches wired to a single load, or "multi-way switch," which has three or more switches to control the load. In the case of a three-way light switch setup, one switch is connected to a hot wire, the other switch is connected to a load wire and the two switches are connected to each other by two separate traveler lines.

BRIEF SUMMARY

According to an embodiment of the disclosed subject matter, a method of controlling an electrical control system in an electrical box of a premises, the electrical control system including a switch module to control power delivery from a power source to at least one load, the switch module including first and second traveler lines to connect the switch module to a load or to a corresponding switch in a multi-way configuration, includes receiving, at the switch module, a first signal from the first traveler line, receiving, at the switch module, a second signal from the second traveler line, receiving, at the switch module, a third signal from a common line, where the common line is connected to the load or the power source, identifying a predetermined waveform pattern based on the first signal, second signal and third signal, determining a state of the load based on the identified waveform pattern, and controlling a display of a user interface based on the determined state of the load.

According to another embodiment of the disclosed subject matter, a modular electrical control system for installation in an electrical box of a premises includes a switch module to control power delivery from a power source to at least one load, the switch module including first and second traveler lines to connect the switch module to a load or to a corresponding switch in a three-way configuration, the switch module including a detector circuit that: 1) receives inputs from the first traveler line, the second traveler line, and a common line that is connected to either the power source or the load, 2) compares the received inputs against each other and/or respective threshold values, and 3) outputs the comparison results, and a processor that identifies a predetermined waveform based on the output received from the detection circuit and determines a state of the load, and a removable user interface module configured to connect to the switch module and receive power from the switch module. The processor controls a display setting of the user interface module based at least in part on the determined state of the load.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
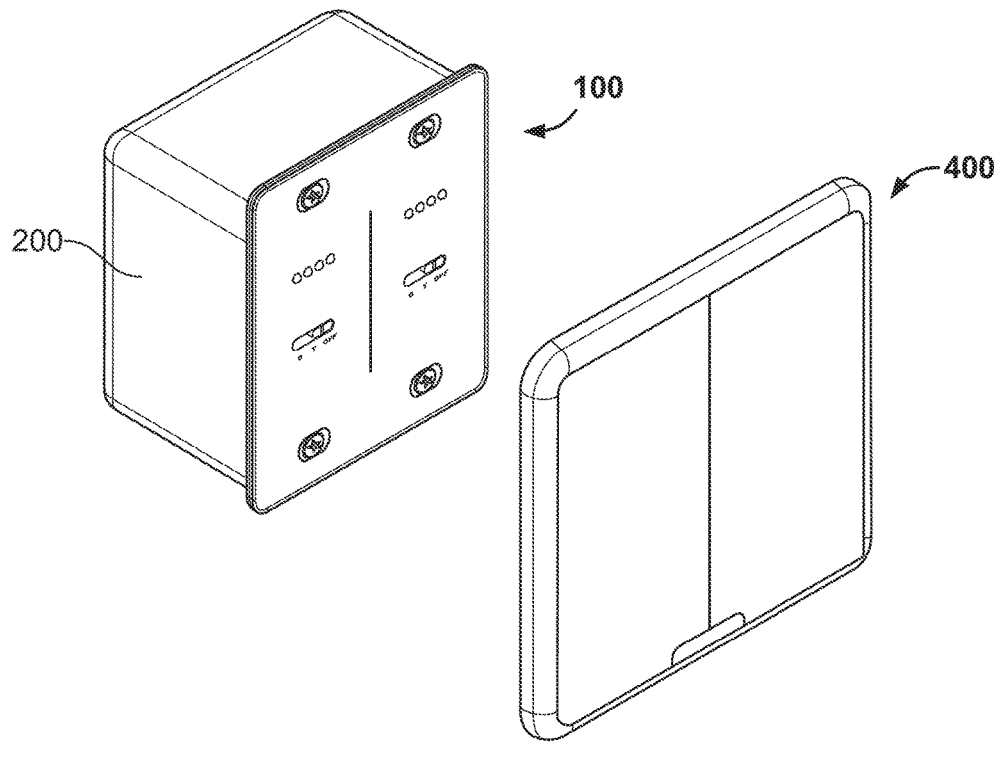
FIG. 1 shows a modular electrical control system according to an embodiment of the disclosed subject matter.

The following description is based on embodiments of the disclosed principles and should not be taken as limiting the claims with regard to alternative embodiments that are not explicitly described herein. Also, various aspects or features of this disclosure are described with reference to the drawings, wherein like reference numerals are used to refer to like elements throughout.

In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are depicted in block diagram form to facilitate describing the subject disclosure.

Lighting controls are frequently found at the entry points of rooms within residential, commercial and industrial buildings. They are installed within switch boxes which are typically attached to the underlying structure of the building. Lighting controls have a standardized attachment scheme such that they can be installed, replaced and/or upgraded over time without modification to the switch box. Multiple lighting controls can control a single load, resulting in three-way or multi-way switch configurations.

A traditional simple light switch is essentially a mechanical device that does not require a power source to operate. However, modern "smart switches" can provide additional features, such as, for example, network access that allows the switch to be controlled by a smart phone. Many homes in the US and around the world were built before smart switches appeared on the market and do not include electrical box configurations that support smart switches. Smart switch installation to replace a traditional simple light switch can be time-consuming and error-prone. The risk of non-functional results or potentially damaging mistakes increases when a smart switch is installed to replace a three-way or multi-way switch.

Disclosed embodiments of a modular, smart electrical control system can connect to existing wiring in a premises in any of a variety of configurations, automatically determine a state of the load, and function in a correct mode based on the determination. The disclosed electrical control system includes an in-wall light switch module and a user interface module that attaches and electrically connects to the switch module. The switch module can function in a dimmer mode or toggle mode and automatically determine which mode to operate in after it has been installed. Various features described with respect to the embodiments of the disclosed electrical control system may be omitted or included in different combinations than depicted/described in the examples discussed below.

FIG. 1 depicts an embodiment of an electrical control system 10 according to the disclosed subject matter, including a switch box 200 housing a switch module 100 that draws power for the system 10 and implements switch functionality, and a user interface (UI) module 400 to provide a user with an interface to control the system 10. The configuration depicted is a dual-gang (two circuit) configuration, however, the switch module 100 and UI module 400 can be made in various configurations to accommodate different size and feature requirements.

Figure 2:
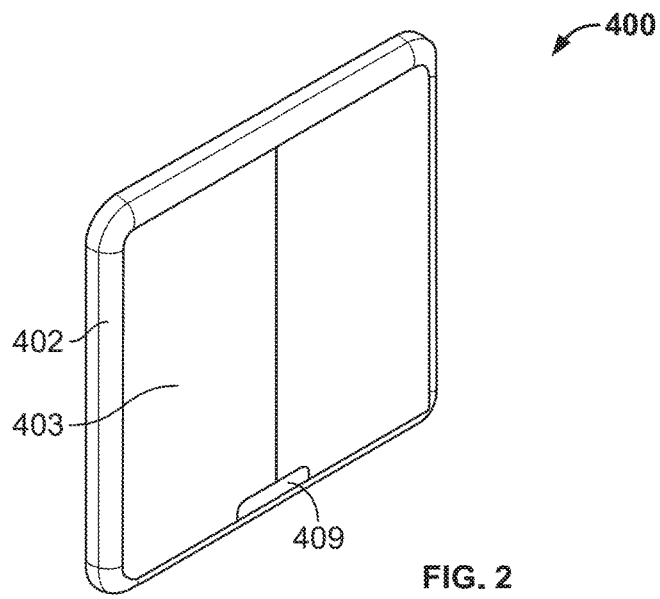
FIG. 2 shows an angled view of a user interface module according to an embodiment of the disclosed subject matter.

FIG. 2 is an angled view of a UI module 400 according to the disclosed subject matter. The UI module includes a lens 403 and front housing 402. A sensor lens 409 is included in this embodiment. As will be described below, the UI module 400 provides controls for smart switch functionality based on a mode (e.g., toggle/dimmer) that the smart electrical control system 10 is set in.

Figure 3:
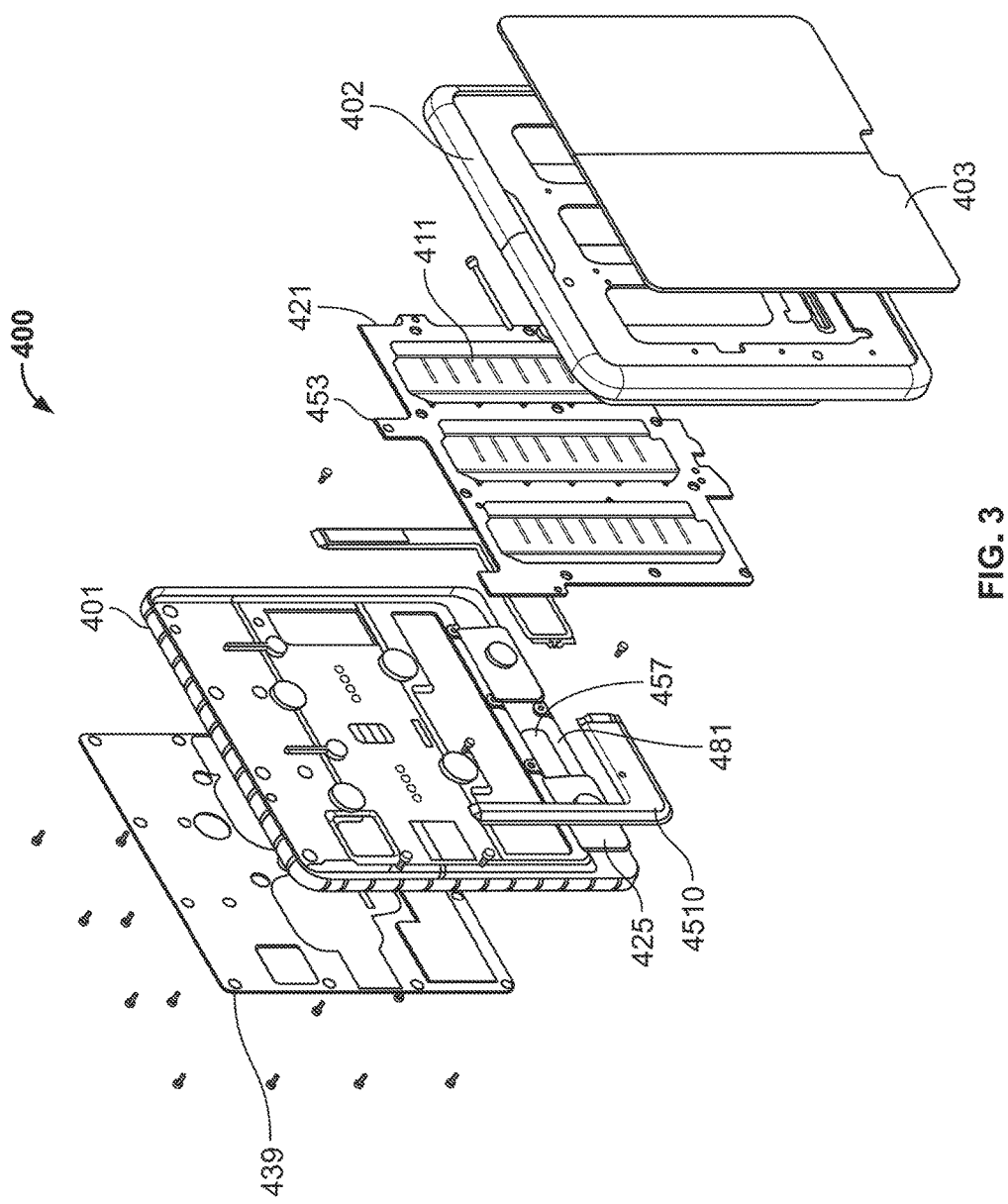
FIG. 3 shows an exploded view of a user interface module from the front according to an embodiment of the disclosed subject matter.

FIG. 3 is an exploded, angled view of an embodiment of the UI module 400 from the front and illustrates an example layout of some of its powered internal components. In this layout an infrared (IR) motion sensor 457 is oriented towards a mirror 481 to direct the light from the sensor lens 409 (FIG. 2) towards the IR motion sensor 457. One or more speakers 425 may be located within an acoustic housing 4510 and connected to a printed circuit board (PCB) assembly 421, which includes a processor and various controllers. The PCB assembly 421 can include a microphone 453. The PCB assembly 421 also may include, beneath a light guide assembly 411, a plurality of LEDs (not depicted) to provide output and a plurality of touch sensors (not depicted) to receive input. To diffuse the light emitted by the LEDs, the light guide assembly 411 can be implemented as molded plastic, film sheets, or the like. A rear cover 439 attaches to the rear housing 401.

The UI module 400 can display an interface for smart switch functionality in various modes, such as toggle mode or dimmer mode. For example, the PCB assembly 421 can control the LED's to display lighting through the light guide assembly 411 according to a current mode setting and thereby indicate a state of the load (e.g. a current light setting, fan setting, etc), or provide other audio/visual information to a user. The lens 403 can include a printed layer such as an additional masked pattern that allows light to be emitted only in certain areas, for example to aid in creating a display suitable for a given mode.

Figure 4:
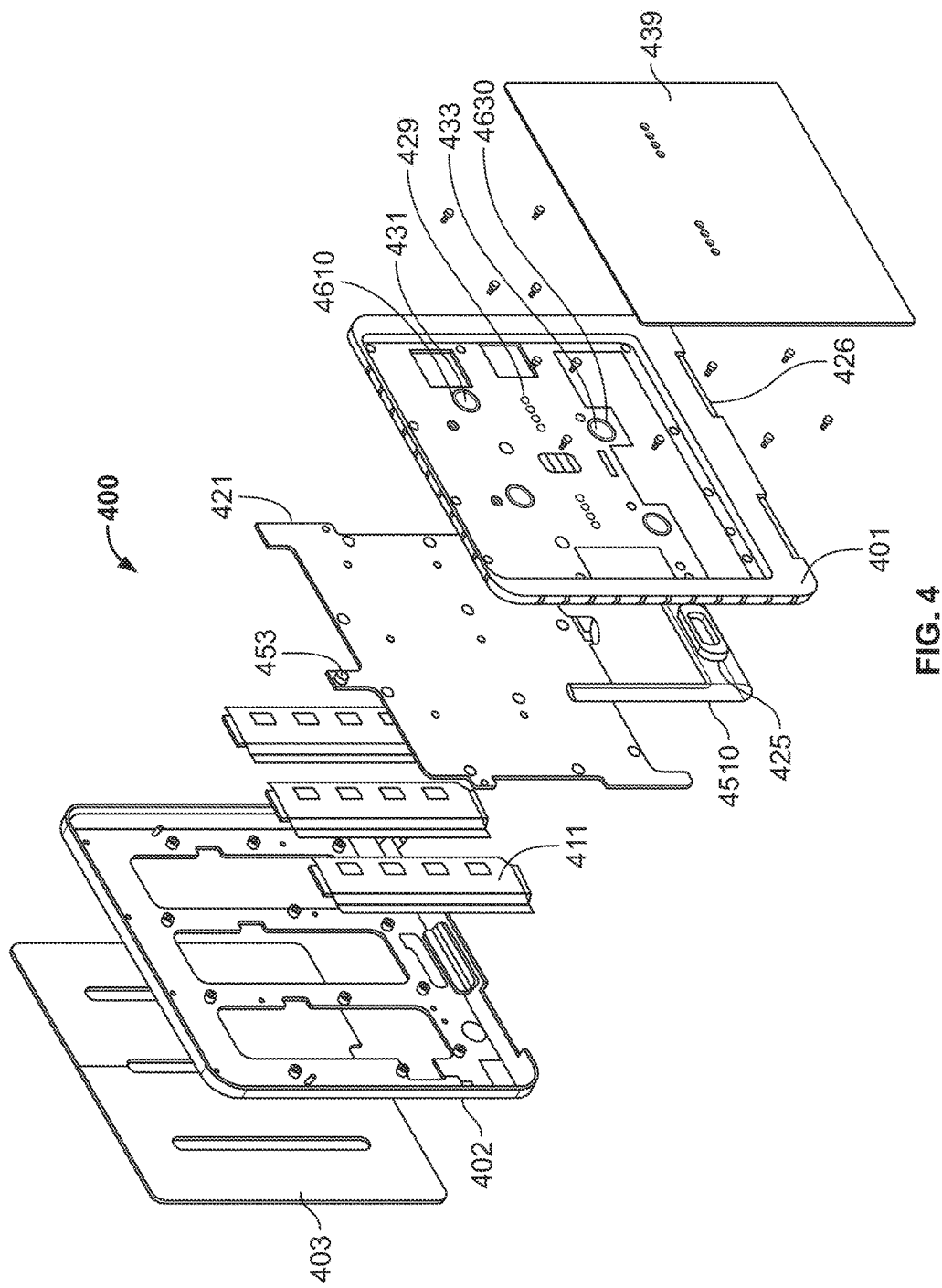
FIG. 4 shows an exploded view of a user interface module from the rear according to an embodiment of the disclosed subject matter.

FIG. 4 is an exploded, angled view of an embodiment of the UI module 400 from the rear, depicting an example layout of various components that interact with the switch module 100 (FIG. 1). The UI module 400 includes a mechanism for attaching or fastening to an underlying switch module 100. The mechanism can be implemented, for example, via magnets, hooks, slots, clips or other types of fasteners. As will be described below, the UI module can also include a data transmission system to communicate with the switch module, for example, pins or a transceiver, an IR light emitter and IR light detector or the like, and a power transmission system to supply power to or receive power from a switch module.

The embodiment depicted in FIG. 4 includes contact pins 429 to receive/transmit power and transmit/receive data, and retention magnets 431, 433 surrounded by ferrous steel shrouds 4610, 4630 to attach to the switch module 100. One or more audio ports 426 can be formed in the rear housing 401.

The UI module 400 is not limited to the embodiments or component layouts depicted in FIGS. 3-4, but can also be constructed with different layouts and include other sensors, for example, to detect temperature, humidity, ambient light, motion, and so on. In one embodiment, a UI module 400 can include one or more of a video camera, LCD display, ambient light sensor, and IR motion sensor.

Figure 5:
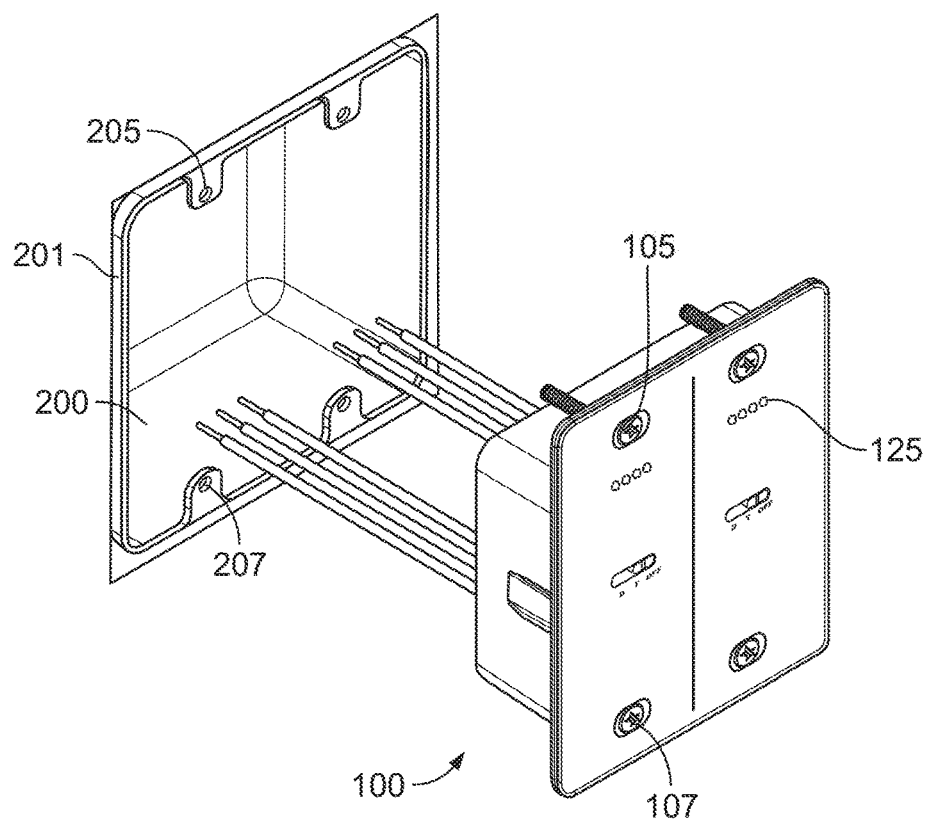
FIG. 5 shows an exploded view of a switch module according to an embodiment of the disclosed subject matter.

Turning now to details of the disclosed switch module 100, FIG. 5 depicts an angled, exploded view of a switch module 100 assembly in switch box 200. The switch box 200 has threaded holes, e.g., 205, 207 to retain the switch module 100 using screws, e.g., 105, 107. In typical applications the switch box 200 is surrounded by building material 201 such as drywall. In the embodiment depicted, the switch module 100 is installed into a dual gang switch box 200. The switch module 100 includes contact pins 125 which may transmit power to the UI module 400 and receive data signals from the UI module 400.

Figure 6:
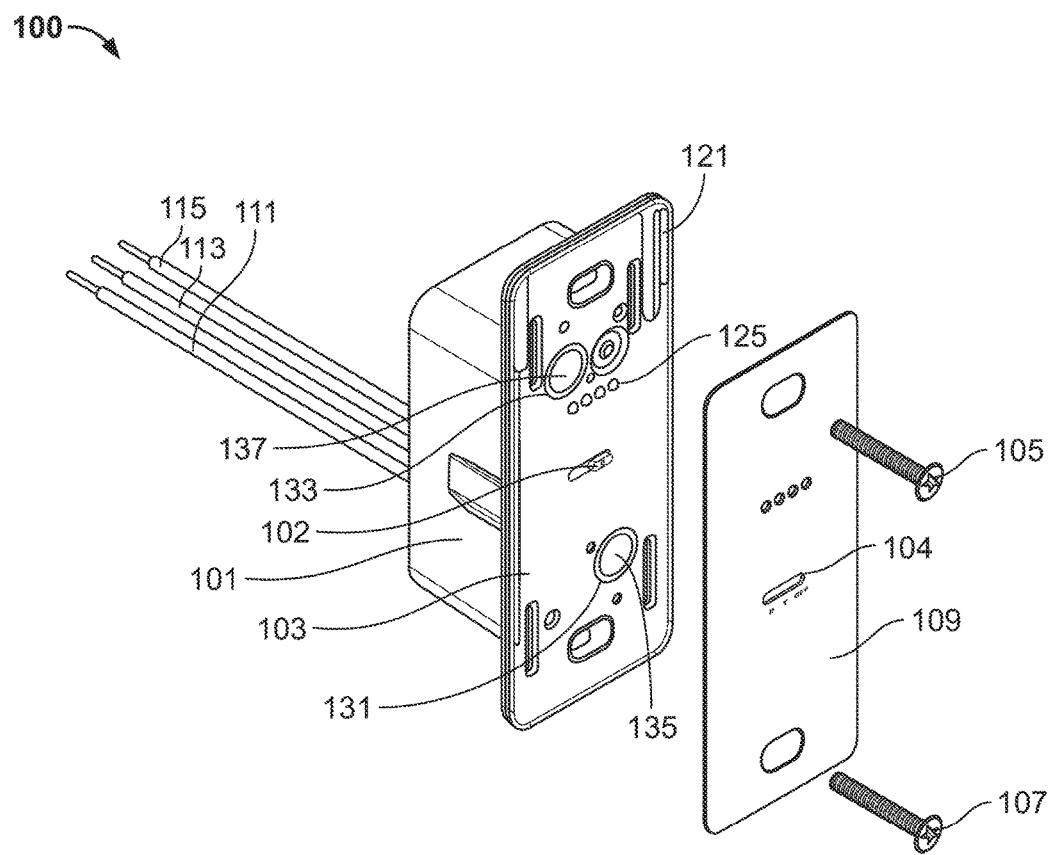
FIG. 6 shows another exploded view of a switch module according to an embodiment of the disclosed subject matter.

FIG. 6 is an angled, exploded view of a switch module 100 in a single-gang configuration. A first screw 105 and second screw 107 are used to retain the switch module 100 to a switch box. The switch module 100 includes front cover 109, front housing 103, and a main housing 101 that holds most of the internal components of the switch module 100, including a printed circuit board PCB assembly (not shown). The layout and configuration of the PCB and internal components can change based on the implementation of different features.

The switch module 100 includes a plurality of connectors 111, 113, 115 for connecting the switch module 100 to a building's existing electrical wiring, e.g., through a gang box. The connectors 111, 113, 115 allow the switch module 100 to draw electrical power from the building and to execute switching functionality for the load (e.g., light, fan, etc.) that the switch module 100 is installed to control.

In the main housing 101, the switch module 100 can include a power transmission system to transmit power to the UI 400, for example, using contacts or a wireless power transmission coil. The embodiment depicted in FIG. 6 includes contact pins 125 configured to transmit power to a UI module (not shown) when attached to the UI module.

The switch module 100 includes an antenna 121 disposed behind the front cover 109 to allow wireless communication with external electronic devices, e.g., smart phones, tablets, laptops, smart watches, etc. The antenna also can be used by one switch module to communicate with another switch module, for example, using wireless networking standards such as IEEE 802.15.4, which higher level protocols such as ZigBee and Thread are based on. Thus, multiple switch modules throughout a home can communicate with each other. In other embodiments, the switch module may offer no wireless connectivity and such connectivity may be included in the UI module.

Instead of peer-to-peer or one-to-many network topologies, a plurality of switch modules installed in a home may form a mesh network such that a single point of failure does not impact connectivity for other devices in the home. When a UI module 400 physically docks over a switch module 100 that is connected to the wireless mesh, the UI module 400 can use the contact pins 125 to communicate with the underlying switch module 100 and send commands and/or data through the mesh network instead of directly joining the wireless mesh. Using this configuration a UI module 400 can control any switch module on the mesh network and is not limited to controlling a switch module physically connected to the UI module.

Referring back to FIG. 6, the switch module 100 can also include a mechanism for attaching or fastening to the UI module, for example, magnets, hooks, slots, clips or other types of fasteners. In the embodiment depicted, two magnets 135, 137 are disposed behind the front cover 109, surrounded by two ferrous steel shrouds 131, 133 on all sides other than the side facing the front cover 109. The magnets 135, 137 can passively maintain a force that can be used to hold a UI module against the switch module 100, providing an additional advantage of reducing the number of parts that require interlocking or clicking that are susceptible to wear and tear.

The switch module 100 can also include a data transmission system, for example, contact pins, a transceiver, an infrared (IR) light emitter and IR light detector or the like. In one embodiment, the IR light emitter and IR light detector on the switch module 100 may be part of the same physical component. In the embodiment depicted in FIG. 6 contact pins 125 protrude through the front cover 109 and function as a data transmission system.

The switch module 100 itself can also implement a tactile switch (not shown) such that if a user presses on a front face of the switch module 100 the tactile switch will actuate and trigger an input to control a load, such as a light or fan, or trigger execution of an operation on a different device, such as turn on/off a radio. An indicator can be included on the front cover 109 to show a region for the user to press to actuate the switch module.

The switch module 100 can also include a slidable switch 102 disposed behind the front cover 109. The slidable switch 102 is accessible through opening 104 in the front cover 109. The slidable switch 102 enables a user to control the switch module 100 to implement various operating modes, such as dimmer (TRIAC-based) or toggle (relay-based) operation modes.

Turning now to cooperation between the UI module 400 and the switch module 100, referring to FIGS. 4 and 6, retention magnets 431, 433 are positioned to draw the UI module 400 into alignment with the magnets 135, 137 of the switch module 100. In this manner, the UI module 400 is automatically retained in proper alignment and position with the switch modules 100 by the retention force of the magnets.

Figure 7A:
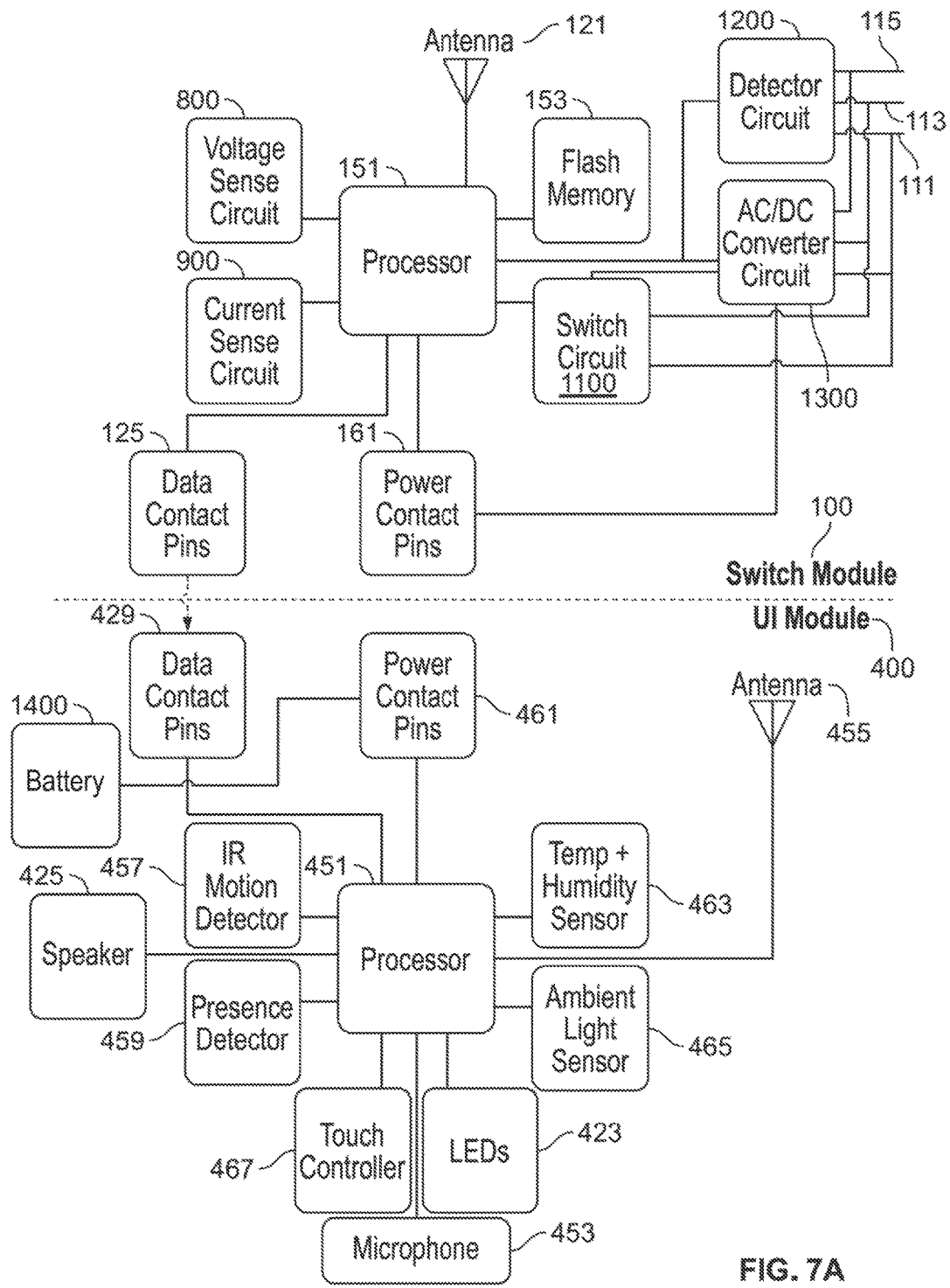
FIG. 7A shows a block diagram of a switch module and user interface module according to an embodiment of the disclosed subject matter.

FIG. 7A is a block diagram of the switch module 100 and the UI module 400. The switch module 100 includes a processor 151 which controls functions executed by the switch module 100. The processor 151 may also comprise its own memory, modem and/or other functions to comprise a "system on a chip" (SoC). The switch module 100 can include a Hall Effect sensor (not depicted) connected to the processor 151 and can include one or more secondary processors (not depicted) to handle certain designated functions or to otherwise aid the processor 151. The switch module 100 also powers contact pins 161 that are capable of transmitting power to the UI module 400.

Processor 151 can transmit data and commands to the UI module 400 via data contact pins 125. Data contact pins 125 can be separate from power contact pins 161 or can be one and the same. The switch module 100 can include flash memory 153 external to the processor 151. The switch module 100 also includes an antenna 121 connected to the processor 151. The switch module 100 further includes a switch circuit 1100, detector circuit 1200, and AC-DC converter circuit 1300 connected to and controlled by the processor 151.

The switch circuit 1100 can include a relay circuit, a triode for alternating current (TRIAC) circuit, and a mode-selectable circuit that allows a user to choose between use of a relay and a TRIAC for controlling the current delivered to a load.

Figure 7B:
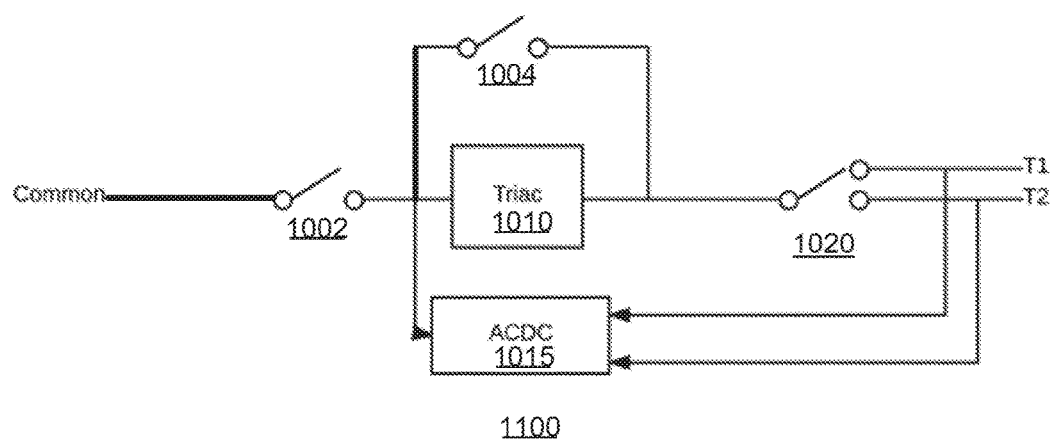
FIG. 7B shows an example configuration of a relay circuit and TRIAC of the switch circuit.

FIG. 7B depicts a block diagram of a switch circuit 1100 which can be included in an embodiment of the disclosed switch module 100. The switch circuit 1100 includes a first relay 1002, a second relay 1004, a TRIAC 1010, an AC-to-DC converter circuit 1015, and a third relay 1020. Additional components not depicted can be included in the switch circuit 1100. The setting of the first relay 1002 and second relay 1004 can be controlled by the slidable switch 102 (FIG. 6). That is, in one configuration first relay 1002, for example, can be opened by moving the slidable switch 102 into a first position, second relay 1004 can be opened by moving slidable switch 102 moving into a second position, and both relays 1002, 1004 can be simultaneously closed by moving the slidable switch 102 into a third position.

The two relays 1002, 1004 and TRIAC 1010 can enable either of a toggle or dimmer mode of operation. That is, if the user wishes to control a load using on/off toggle commands without dimming, the user can move the slidable switch to the third position to set the first relay 1002 and the second relay 1004 both closed. If the user wishes to control a load using dimming functionality, the user can move the slidable switch into the second position to set the first relay 1002 closed and second relay 1004 open. Whenever the user wishes to cease providing power to the load the user can move the slidable switch to the first position to set the first relay 1002 open, thereby creating an air gap in the switch circuit 1100 between the common terminal and the load.

Referring back to FIG. 7A, the switch module 100 can include a voltage sense circuit 800 and a current sense circuit 900. These circuits allow the switch module 100 to monitor amounts of power used by the load attached to it.

The UI module 400 has a processor 451 that can be similar to that of the switch module 100. The processor 451 may have additional components and functionality embedded to comprise a SoC. The UI module 400 can include an antenna 455 which allows two way data communication using protocols such as WiFi. Additional antennas and wireless protocols may be implemented as well but are omitted from the illustration for simplification.

The UI module 400 can include data contact pins 429 and power contact pins 461 to receive/transmit data from the processor 451 and to receive power from the switch module 100 to power the UI module 400 components and charge battery 1400. Data contact pins 429 can be separate from power contact pins 461 or can be one and the same. In one implementation the processor 451 can transmit a status request to the switch module 100 to check, for example, which mode the switch module 100 is set in or a state of the load controlled by the switch module 100. Based on the received response, the processor 451 can control the UI module 400 to display an appropriate interface. In this way the UI module 400 can display an interface in accordance with setting of the slidable switch that sets the switch module 100 operational mode.

The UI module 400 also includes a speaker 425 and microphone 453 connected to the processor 451. As previously mentioned, LEDs 423 are included in the UI module 400 and are connected to and controlled by the processor 451 to, for example, display a load status or function as part of an interface. A variety of sensors can be connected to the processor 451, including: temperature and humidity 463, ambient light 465, touch 467, presence 459 and motion 457.

Figure 8A:
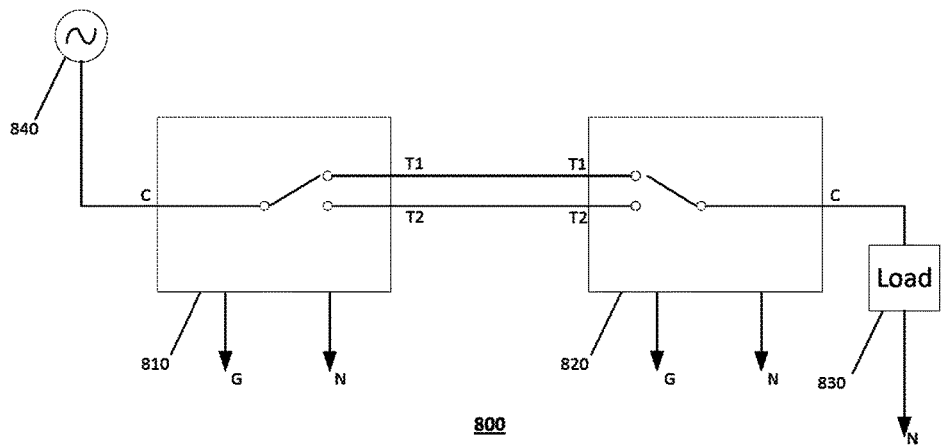
FIG. 8A shows an example three-way switch configuration.

FIG. 8A shows a three-way switch configuration 800. A first three-way switch 810 and a second three-way switch 820 are connected by two traveler lines T1, T2. Both switches 810, 820 may have neutral N and ground G terminals. The first switch 810 has a common terminal C connected to an AC power supply 840, and the second switch 820 has a common terminal C connected to a load 830 (e.g., a light bulb). In this configuration the first switch 810 connected to the supply 840 is considered to be in an "upstream" position and the second switch 820 connected to the load 830 is considered to be in a "downstream" position.

Figure 8B:
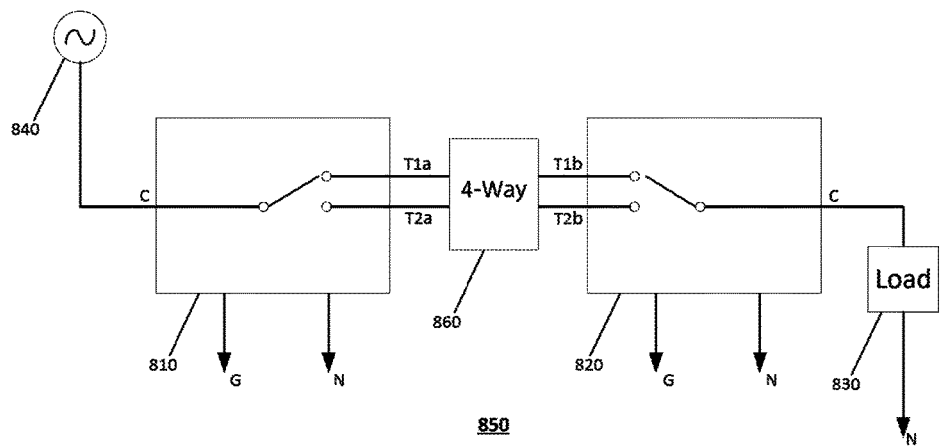
FIG. 8B shows an example multi-way switch configuration.

FIG. 8B shows a multi-way switch configuration 850. In this configuration one or more four-way switches 860 are connected between the upstream first switch 810 and the downstream second switch 820. The four-way switch 860 has four terminals for traveler lines T$1a$, T$1b$, T$2a$, T$2b$. Two sets of traveler lines are present, and in a first position the four-way switch 860 connects traveler T$1a$ to T$1b$ and T$2a$ to T$2b$ while in a second position the four-way switch 860 connects traveler T$1a$ to T$2b$ and T$2a$ to T$1b$ in order to provide an ON/OFF function to the load 830.

In the three-way switch configuration or the multi-switch configuration, the disclosed smart electrical control system can be installed to replace a legacy simple switch in either the upstream or downstream position. In order to support a dimmer function the disclosed smart electrical control system should be placed in the downstream position. If placed in an upstream position, the system should be limited to a toggle function.

Referring to FIGS. 7A and 8A, detector 1200 can provide operational functions to determine the status of the load. Traveler T1, traveler T2 and the common line C can be connected as inputs to detector 1200. The detector 1200 compares signal voltage levels received at the inputs to each other and/or to reference voltages to determine outputs to the processor 151. Based on the received outputs from the detector 1200, the processor 151 automatically determines the status of the load, and in some cases, whether the device is disposed in an upstream or downstream position.

Figure 9A:
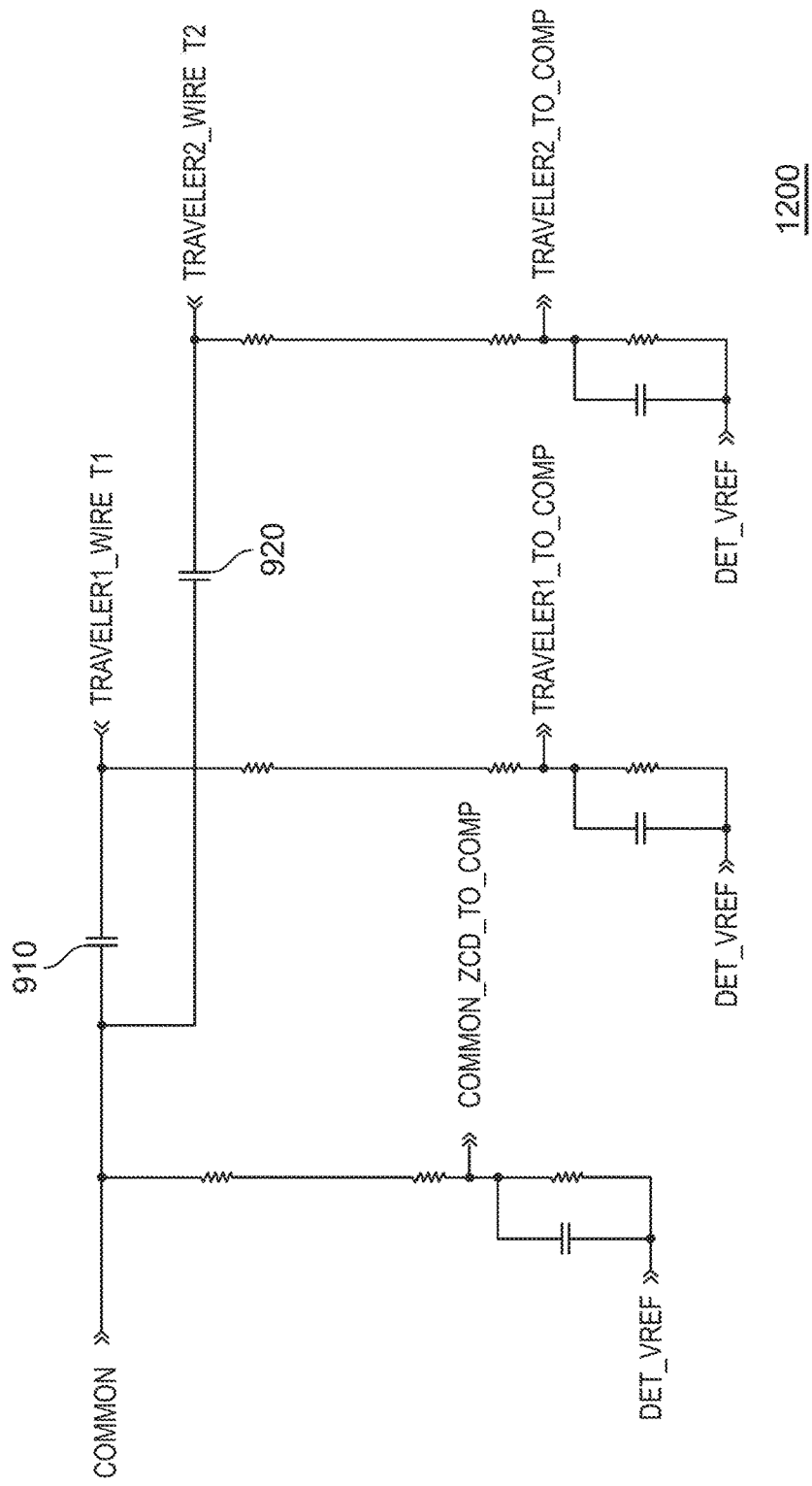
FIGS. 9A and 9B show an example layout for a detector circuit according to an embodiment of the disclosed subject matter.
Figure 9B:
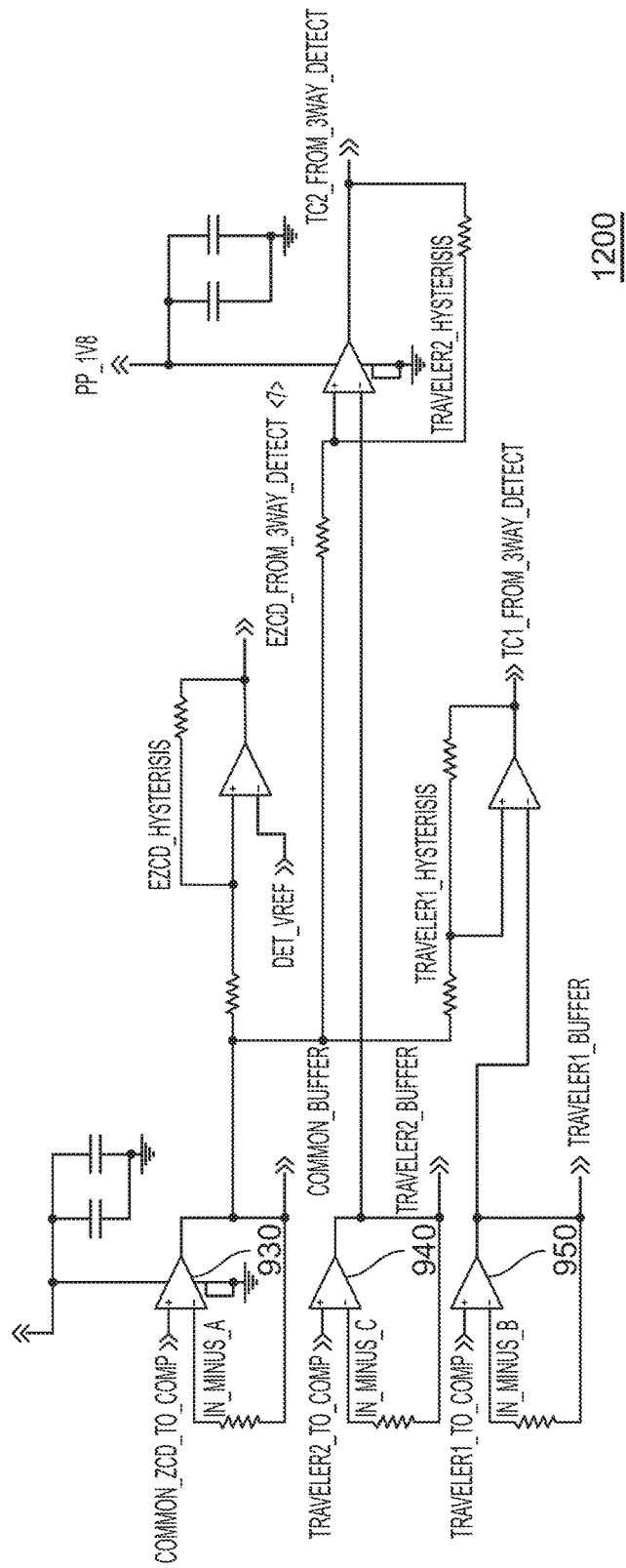

FIGS. 9A and 9B show an example layout for a detector circuit 1200 according to the disclosed embodiments. It should be understood that different layouts are possible within the scope of the disclosed subject matter. The detector circuit 1200 includes a first capacitor 910 connected between the common line and a first traveler line T1, and a second capacitor 920 connected between the common line and a second traveler line T2. The first and second capacitors 910, 920 force a small leakage current from the common line to both traveler lines T1, T2.

Each of the common line, first traveler line T1, and second traveler line T2 are compared against a first reference voltage DET_REF and the outputs are sent to op amps 930, 940, 950 to buffer the signals before sending them to processor 151 (FIG. 7A).

Based on the buffered signals, the processor 151 can determine a state of the load and determine whether the electrical control system is installed in an upstream or downstream position. The three signals will form a distinct waveform pattern. The processor 151 can identify a predetermined waveform pattern from among a plurality of waveform patterns based on the signals from the common line, first traveler line T1, and second traveler line T2, determine a state of the load based on the identified waveform pattern, and control the user interface module based on the determined state of the load.

Several example waveform patterns will be described with respect to a three-way switch configuration, however, the disclosed subject matter is not limited to these waveform patterns. Additional waveform patterns can be used to indicate load states, installation positions or other information regarding a three-way or multi-way switch configuration.

Figure 10:
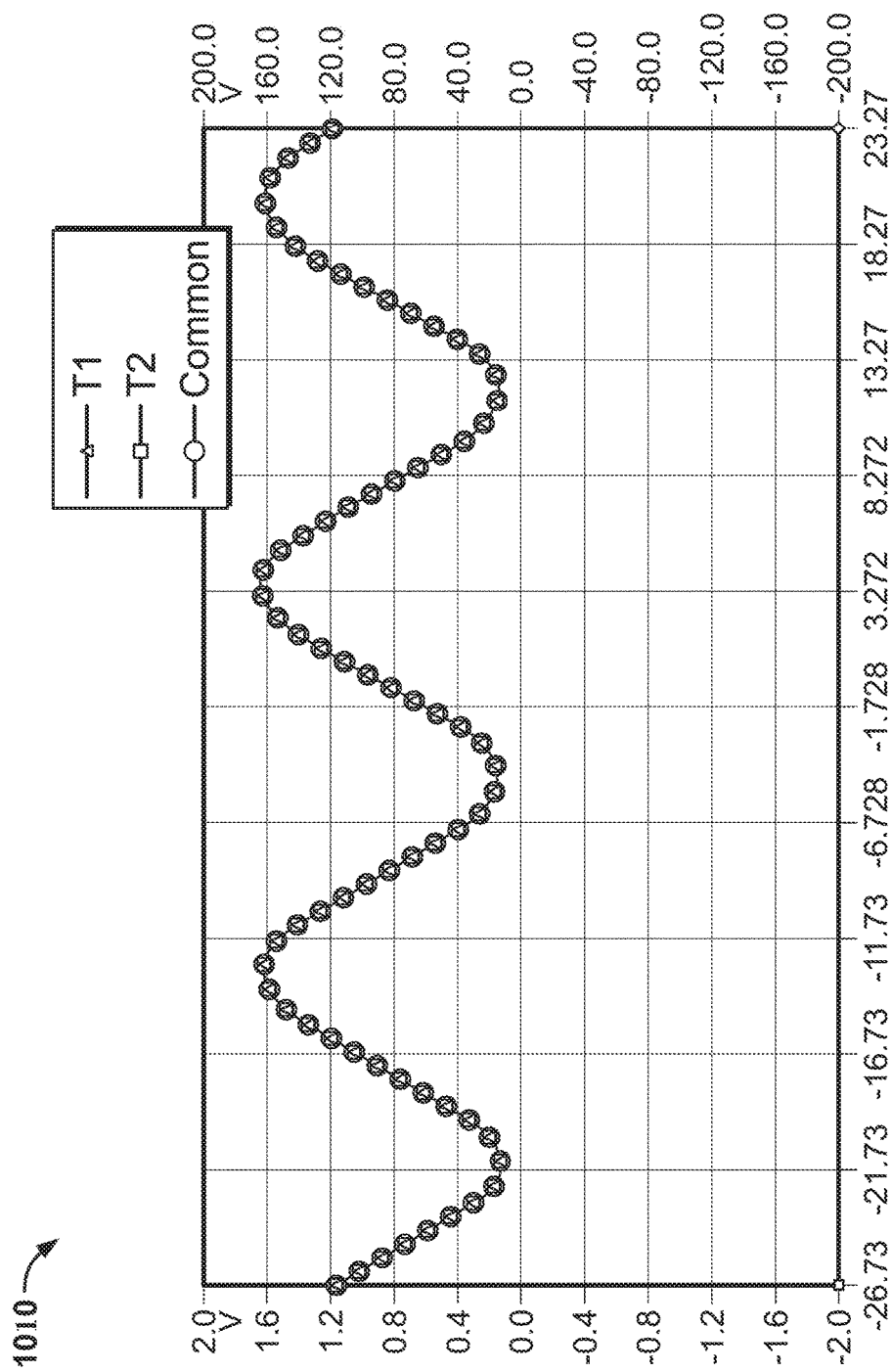
FIG. 10 shows an example waveform pattern according to an embodiment of the disclosed subject matter.

FIG. 10 shows an example waveform pattern 1000 of the common line, first traveler line T1, and second traveler line T2. In waveform pattern 1000 all three waveforms (common, T1, T2) are in phase and substantially equal. The AC sine wave is also present in all cases. This waveform pattern indicates either of two conditions: 1) load is ON, or 2) load has been removed (e.g., burnt bulb).

Figure 11:
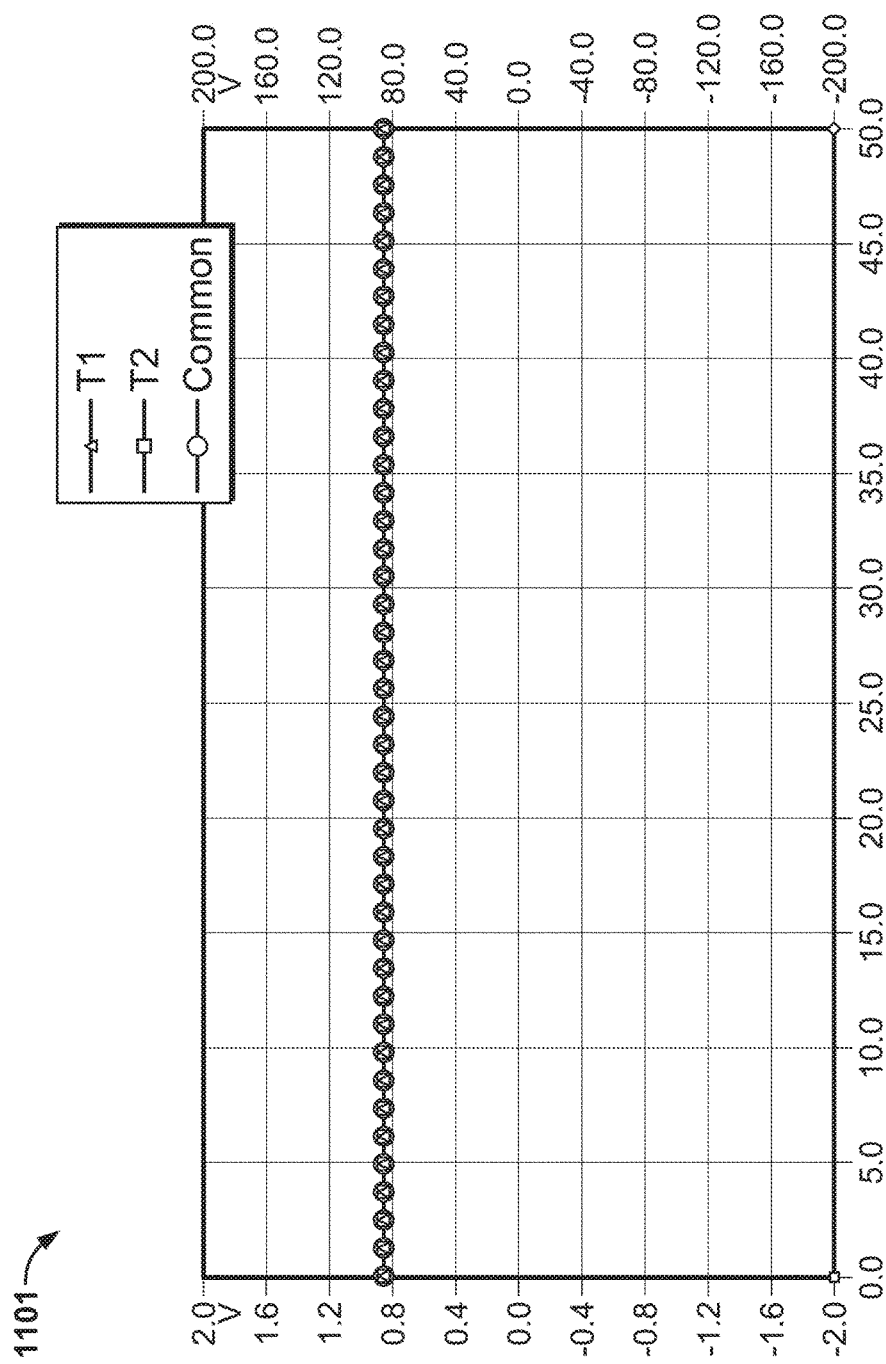
FIG. 11 shows another example waveform pattern according to an embodiment of the disclosed subject matter.

FIG. 11 shows another example waveform pattern 1101. In waveform pattern 1101 all three waveforms (common, T1, T2) are equal at reference voltage DET_VREF. No AC sine wave is present. This waveform pattern indicates an AC mains power loss.

Figure 12:
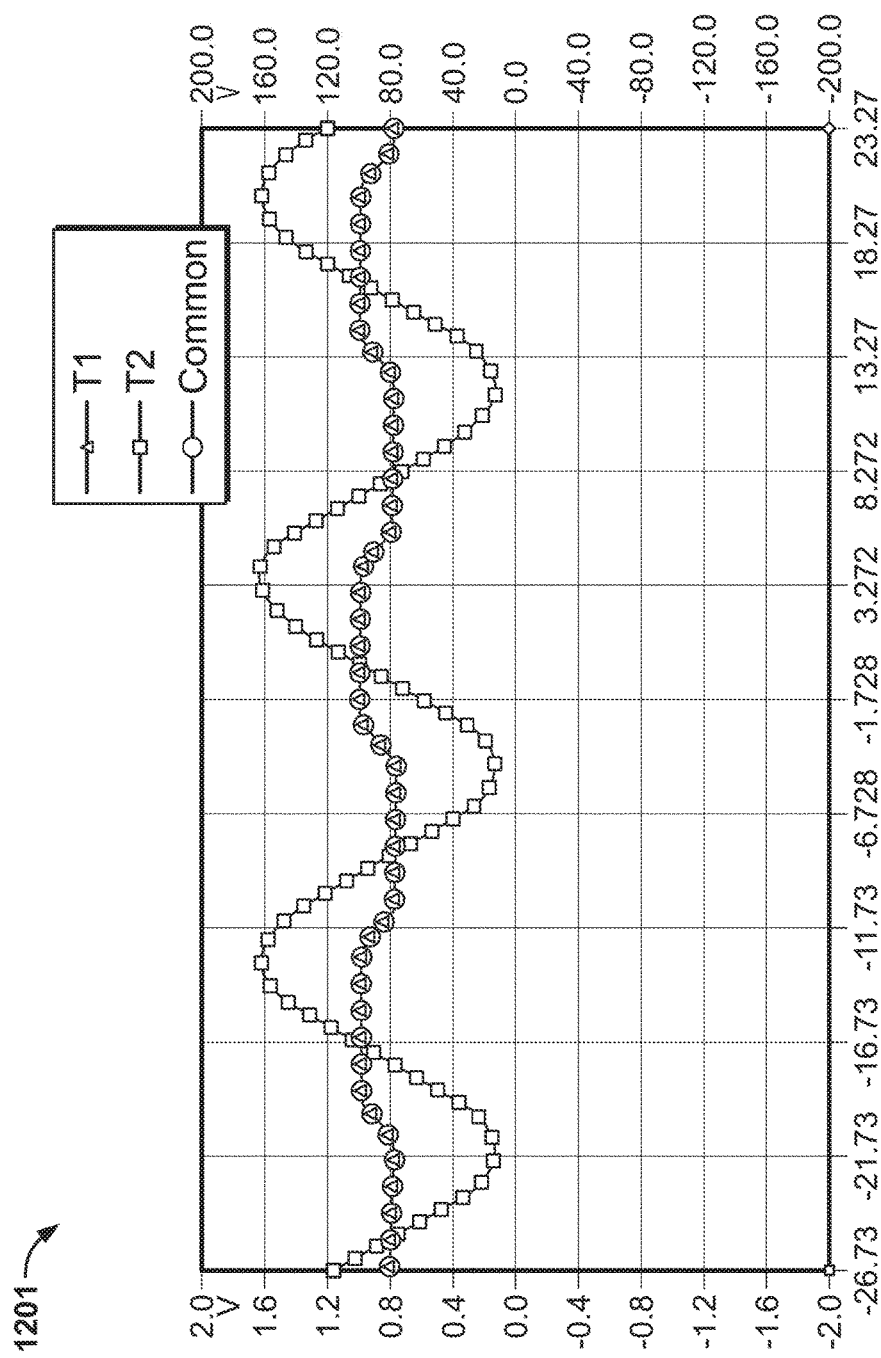
FIG. 12 shows another example waveform pattern according to an embodiment of the disclosed subject matter.

FIG. 12 shows another example waveform pattern 1201. In waveform pattern 1201 the traveler T1 and common waveforms are in phase and substantially equal. An AC sine wave form is present. The amplitude of the waveform for traveler T2 is greater than the amplitude of the waveforms for T1 and common. This waveform pattern indicates that the load is in an OFF state and the electrical control system is installed in a downstream position.

Figure 13:
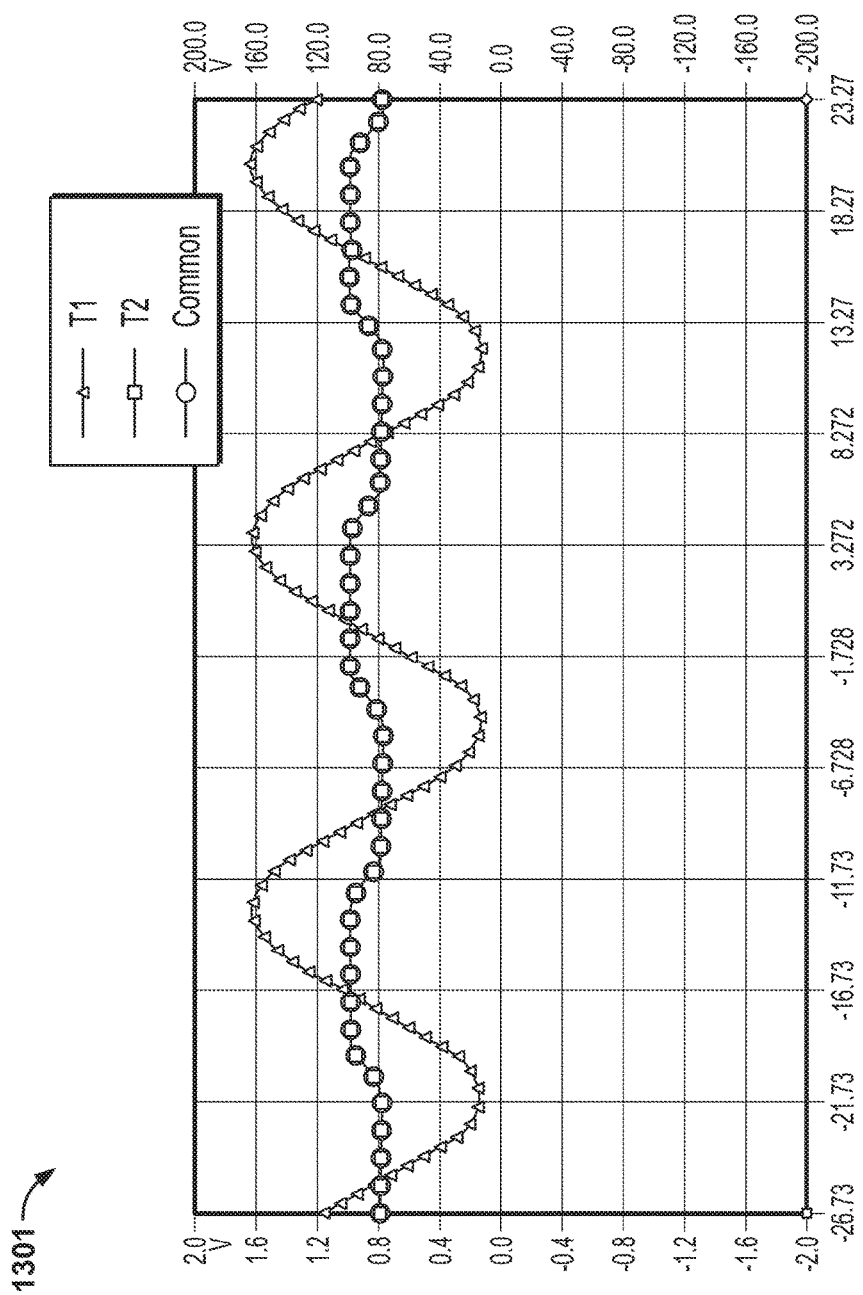
FIG. 13 shows another example waveform pattern according to an embodiment of the disclosed subject matter.

FIG. 13 shows yet another example waveform pattern 1301. In waveform pattern 1301 the common waveform and traveler T2 waveform are in phase and substantially equal. This combination occurs when the load is in an OFF state. The amplitude of the common/traveler T1 waveform is lower than the amplitude of the traveler T1 waveform. This difference only occurs when the electrical control system is installed in a downstream position. Thus, based on detecting this waveform pattern the processor can determine that the load is in an OFF state and the electrical control system is in a downstream position.

Figure 14:
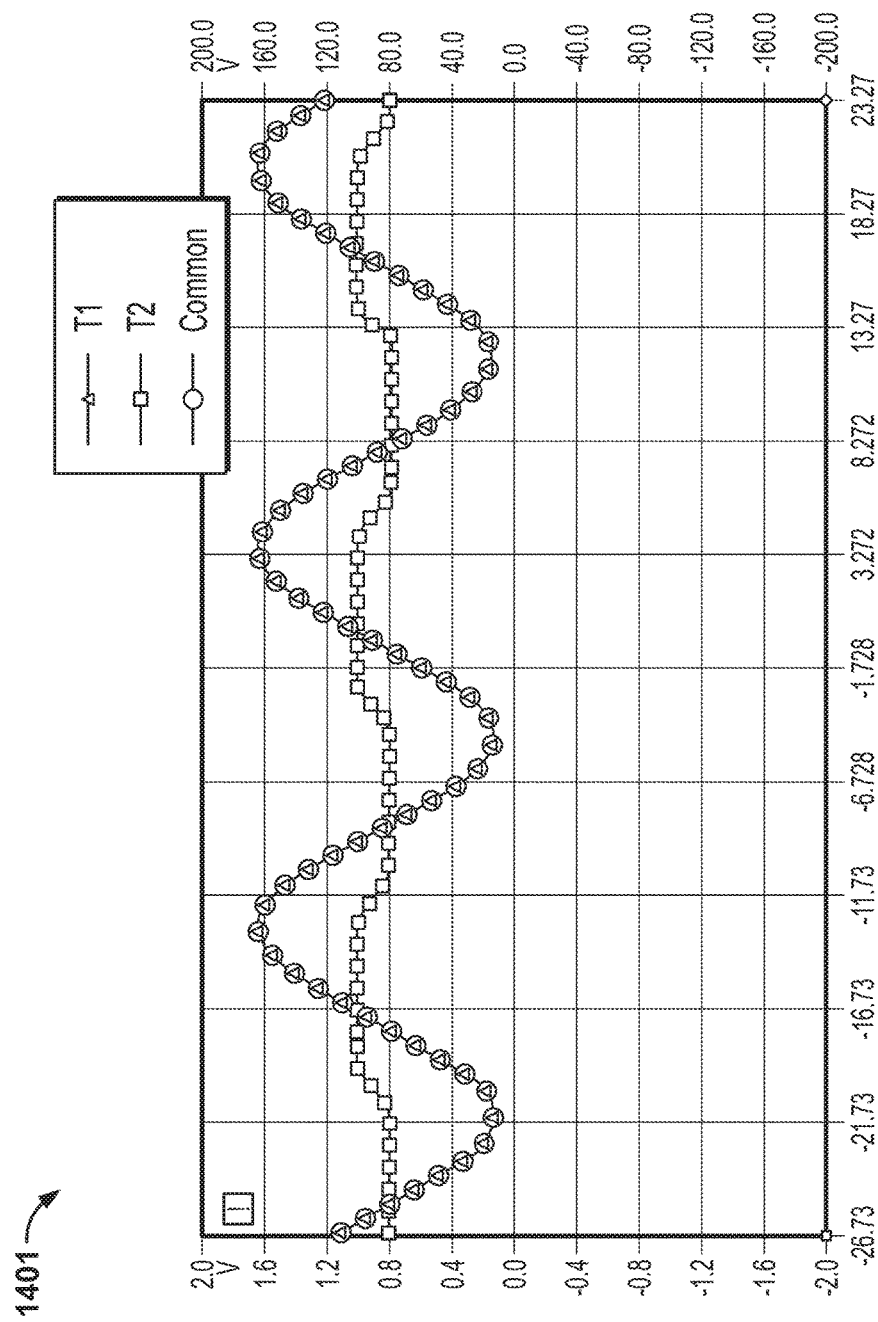
FIG. 14 shows another example waveform pattern according to an embodiment of the disclosed subject matter.

FIG. 14 shows another example waveform pattern 1401. In waveform pattern 1401 the common waveform and traveler T1 waveform are in phase and substantially equal. This combination occurs when the load is in an OFF state. The amplitude of the common/traveler T1 waveform is higher than the amplitude of the traveler T2 waveform. This difference only occurs when the electrical control system is installed in an upstream position. Thus, based on detecting this waveform pattern the processor can determine that the load is in an OFF state and the electrical control system is in an upstream position.

Figure 15:
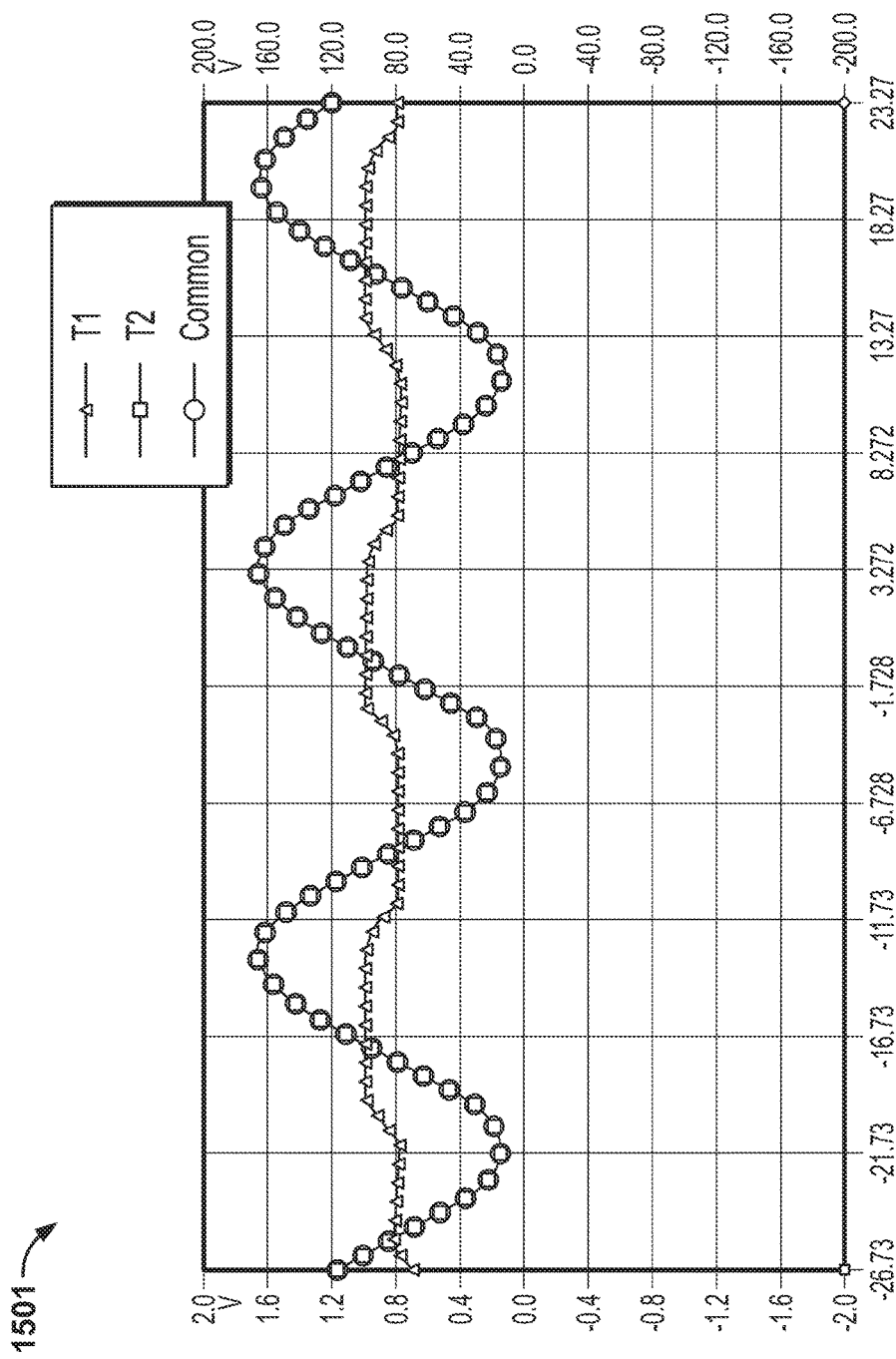
FIG. 15 shows another example waveform pattern according to an embodiment of the disclosed subject matter.
Figure 16:
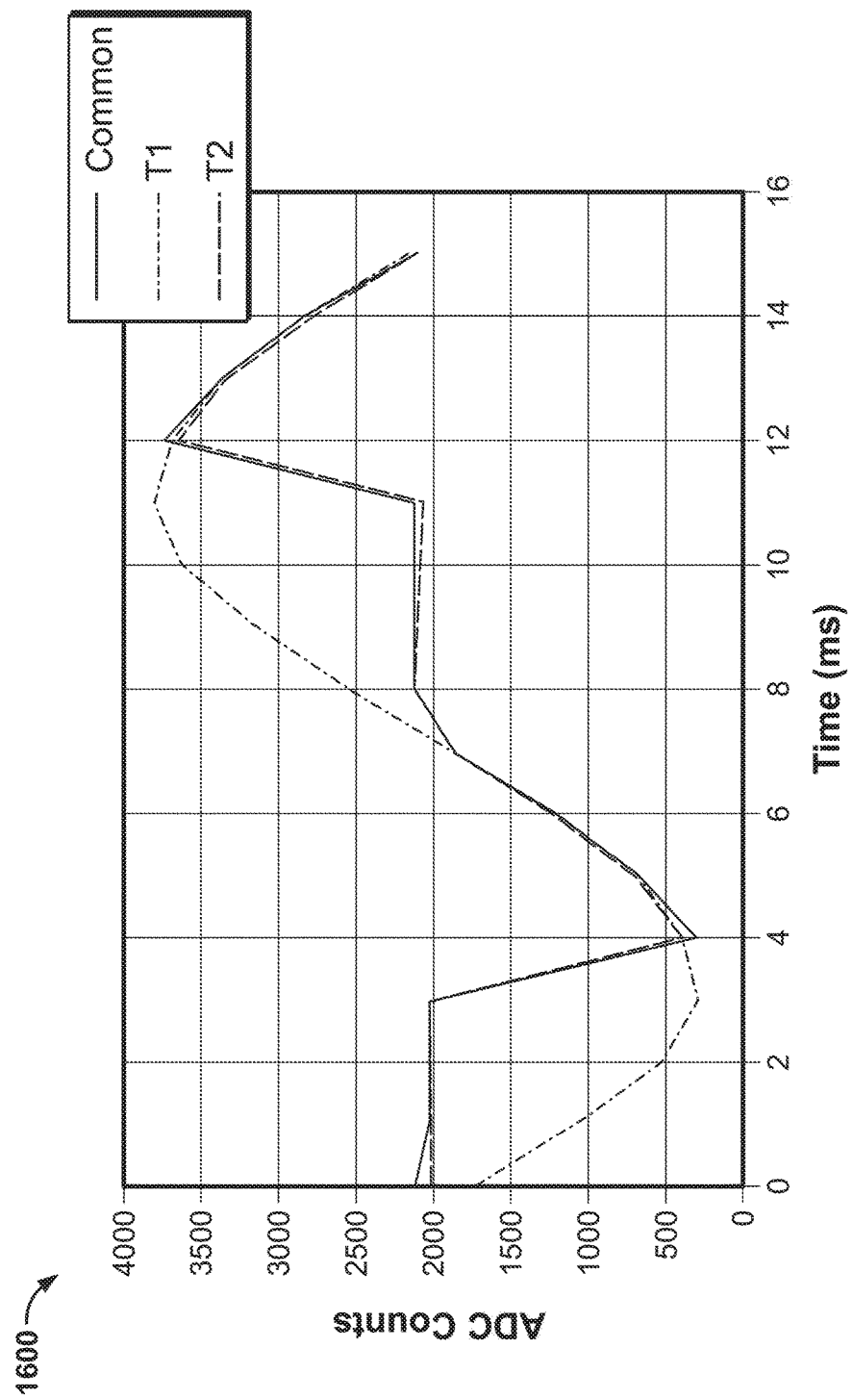
FIG. 16 shows another example waveform pattern according to an embodiment of the disclosed subject matter.

FIG. 15 shows still another example waveform pattern 1501. In waveform pattern 1501 the common waveform and traveler T2 waveform are in phase and substantially equal. This combination occurs when the load is in an OFF state. The common waveform and traveler T2 amplitude are higher than the traveler T1 amplitude, which occurs in upstream installations. Thus, based on detecting this waveform pattern the processor can determine that the load is in an OFF state and the electrical control system is in an upstream position Each of waveform patterns 1000, 1101, 1201, 1301, 1401 and 1501 occur when the load is being operated in a toggle mode. FIG. 16 shows an example waveform pattern 1600 that can occur when the load is being operated in a dimming mode. In waveform pattern 1600 the common waveform, traveler T1 waveform, and traveler T2 waveform are all approximately equal for approximately half of the waveform. This occurs when the TRIAC (i.e., TRIAC 1010 in FIG. 7B) is driven. For example, in waveform pattern 1600 the TRIAC is driven when time=4→7 ms and 12→15 ms. When the TRIAC is not driven, only traveler T1 is high. This can only occur when the switch is downstream and the power supply is applied to traveler T1. Thus, based on detecting this waveform pattern the processor can automatically determine that the load is in an ON state being driven in dimmer mode and that the electrical control device is installed in a downstream position.

Figure 17:
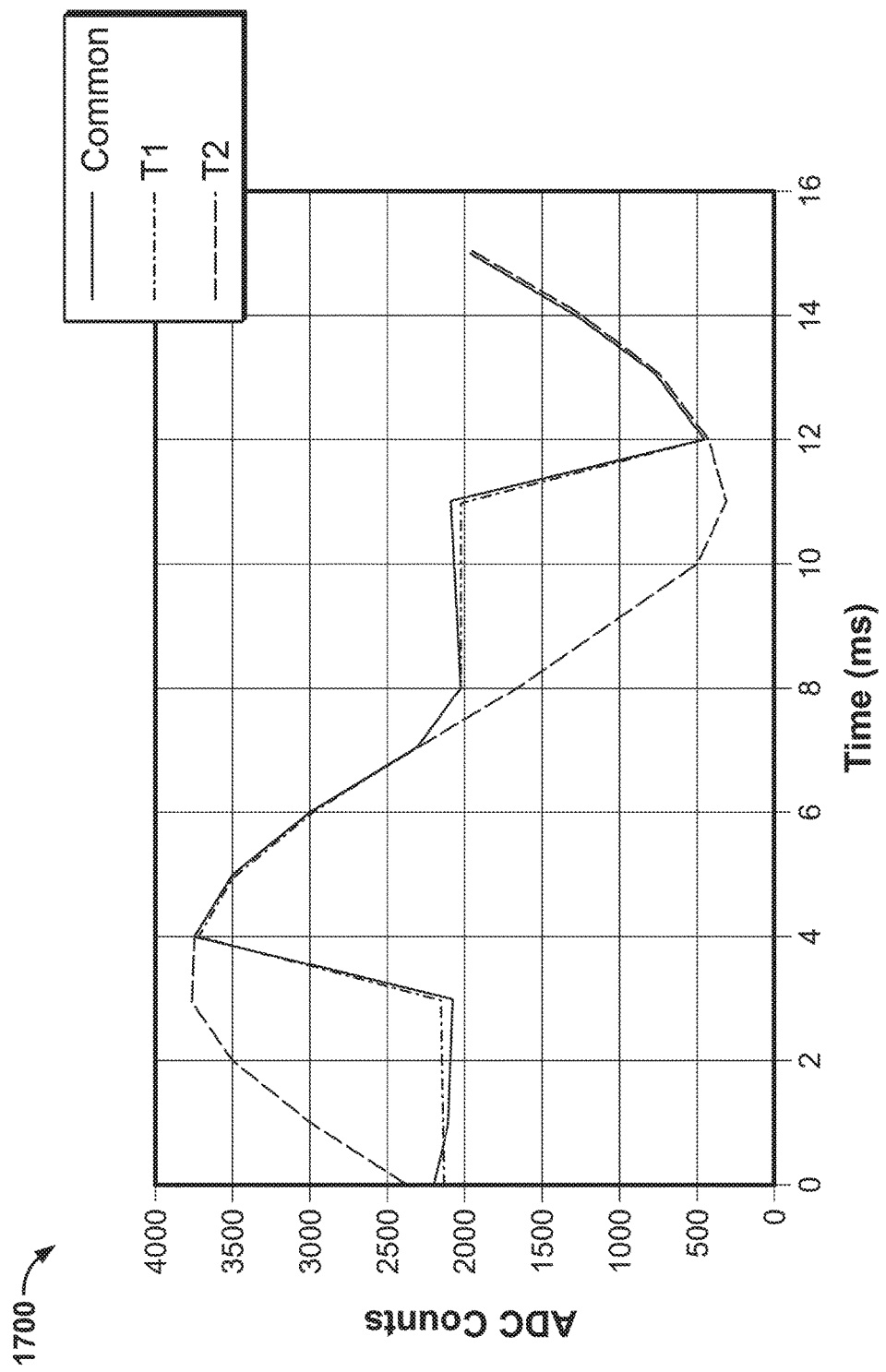
FIG. 17 shows another example waveform pattern according to an embodiment of the disclosed subject matter.

FIG. 17 shows another example waveform pattern 1700 that can occur when the load is being driven in dimmer mode. The common waveform, traveler T1 waveform, and traveler T2 waveform are all substantially equal when the TRIAC is driven. For example in waveform pattern 1700 the TRIAC is driven when time=4→7 ms and 12→15 ms. When the TRIAC is not driven, only traveler T2 is high. Thus, based on detecting waveform pattern 1700 the processor can automatically determine that the load is in an ON state being driven in dimmer more, and that the electrical control device is installed in a downstream position with the supply voltage being applied to traveler T2.

Figure 18:
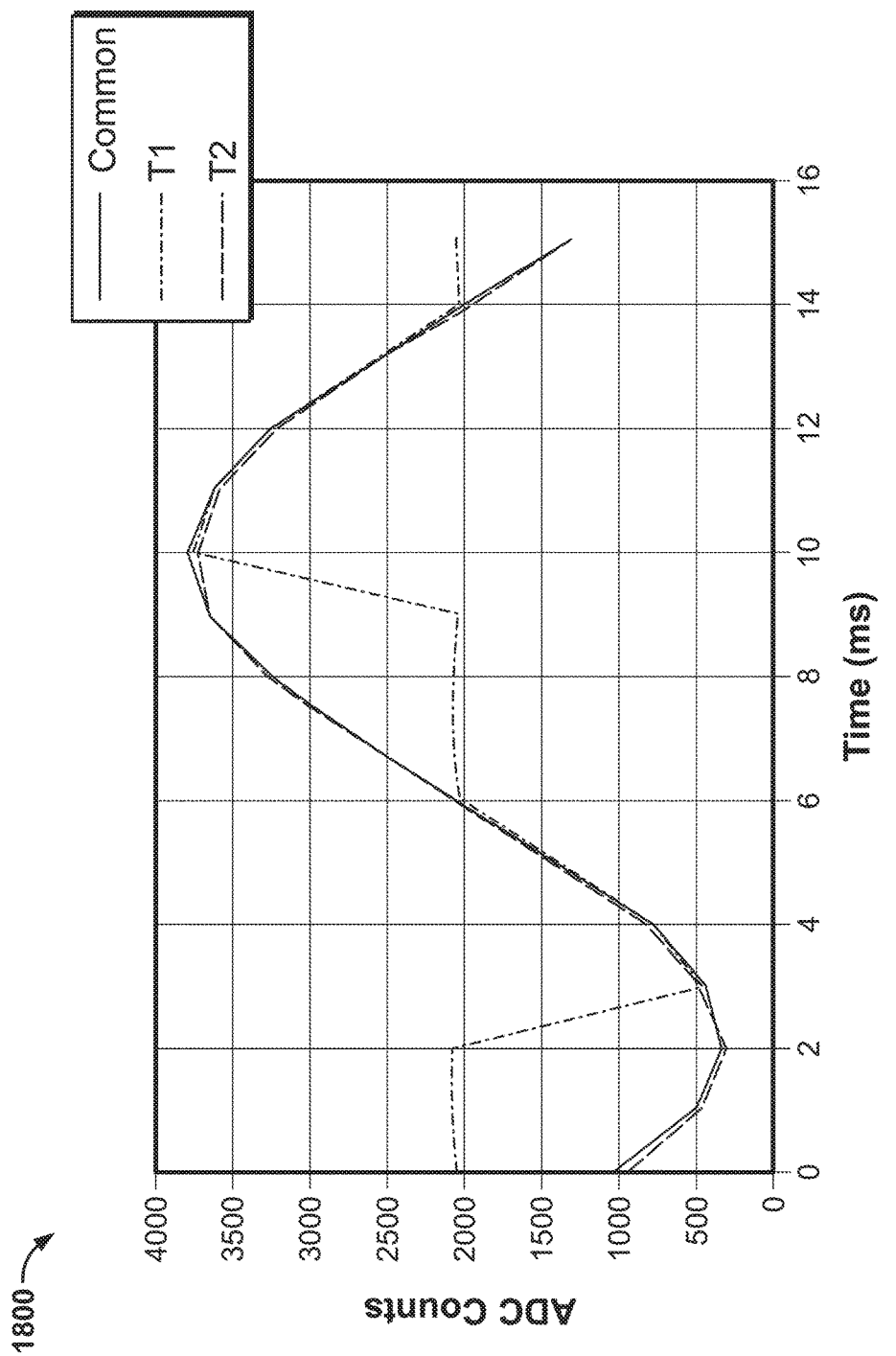
FIG. 18 shows another example waveform pattern according to an embodiment of the disclosed subject matter.

FIG. 18 shows yet another example waveform pattern 1800 that can occur when the load is being driven in dimmer mode. In wave form pattern 1800, the common waveform, traveler T1 waveform and traveler T2 waveform are all substantially equal when the TRIAC is driven, i.e., when time=3→6 ms and 10→14 ms. When the TRIAC is not driven, common and traveler T2 are high (or low). Only traveler T1 shows the load waveform. Thus, based on detecting waveform pattern 1800 the processor can automatically determine that the load is in an ON state being driven in dimmer mode, and that the electrical control device is installed in an upstream position.

Figure 19:
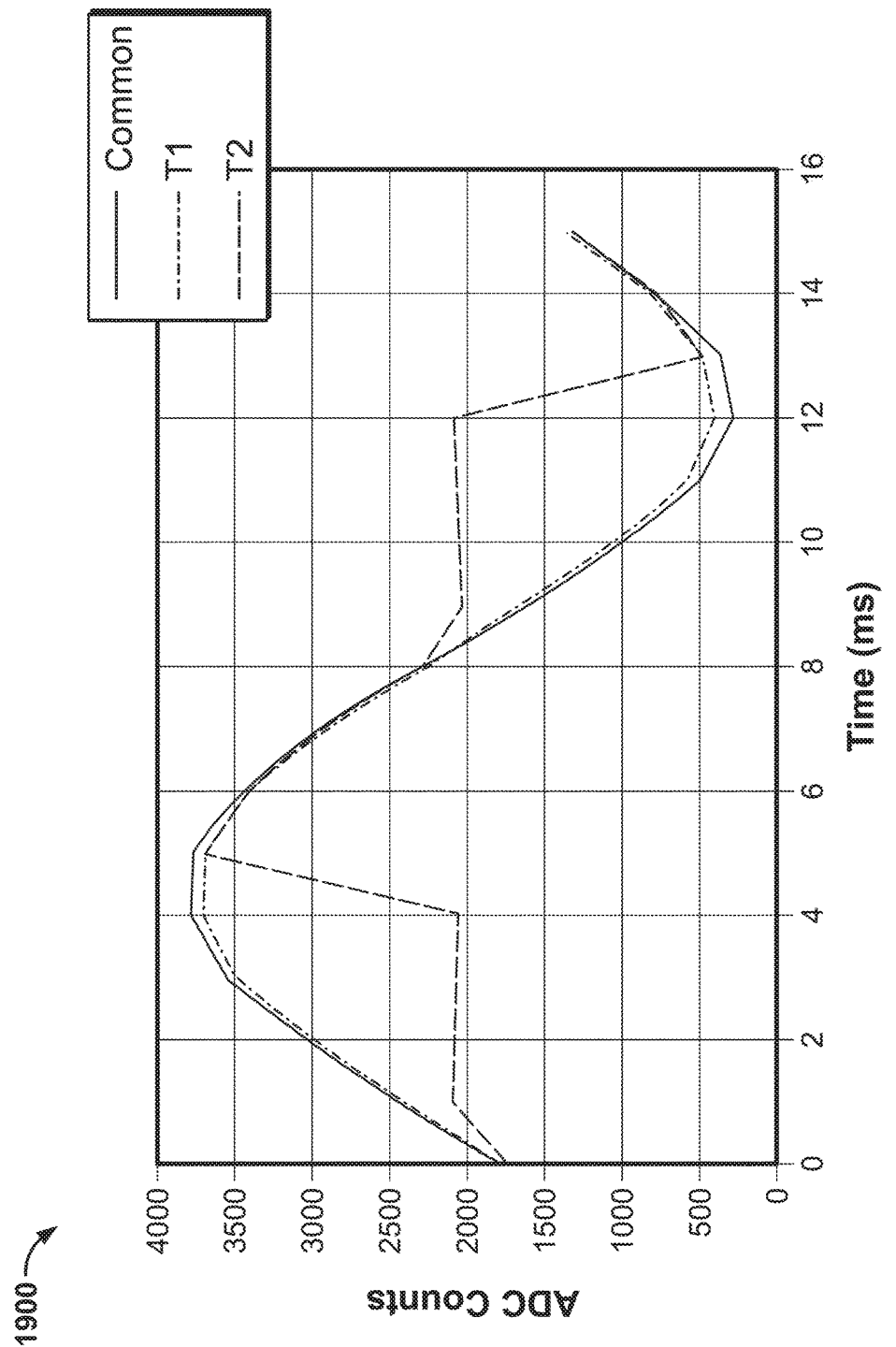
FIG. 19 shows another example waveform pattern according to an embodiment of the disclosed subject matter.

FIG. 19 shows still another example waveform pattern 1900 that can occur when the load is driven in dimmer mode. In waveform pattern 1900, the common waveform, traveler T1 waveform, and traveler T2 waveform are all substantially equal when the TRIAC is driven. For example, in waveform pattern 1900 the TRIAC is driven when time=4→7 ms and 12→15 ms. When the TRIAC is not driven, common and traveler T1 are high (or low). This can only occur when the switch is downstream and the power supply is applied to traveler T1. Thus, based on detecting waveform pattern 1900 the processor can automatically determine load is in an ON state being driven in dimmer mode, and that the electrical control device is installed in an downstream position.

The processor can identify the patterns in any of several different ways. In one embodiment the processor can execute a machine learning algorithm using training data to classify input and recognize predetermined waveform patterns. In another embodiment input data can be stored in a buffer that is periodically checked against a look-up table for matching pre-determined waveform patterns. Generally, implementations of the disclosed embodiments can include a switch module that can receive a first signal from the first traveler line, receive a second signal from the second traveler line, receive a third signal from a common line (i.e., a line that is connected to a load or a power source), identify a predetermined waveform pattern based on the first signal, second signal, and third signal, determine a state of the load based on the identified waveform pattern, and control a display of a user interface based on the determined state of the load.

In one embodiment the waveform pattern recognition can be simplified to an algorithm executed on a relatively small set of input values, where the input values are the common, traveler T1, and traveler T2 signals. Since the integral of the square of a sine wave over one period is equal to half of the amplitude of the sine wave, integrating the signal gives an accurate way of determining the amplitude of the signals.

Determining the integral is a relatively straight-forward function with low computational complexity. The zero of the y axis of the sine can be determined as the average of the sine wave over one period. (The integral of a sine over one period is zero.) This reduces the problem from a stream of values to a small set of values, the amplitudes of the signals: Ac (common), At1 (traveler T1), and At2 (traveler T2).

Based on the waveform patterns shown in FIGS. 10-19, the processor can compare the signal amplitudes against each other and against threshold values to identify predetermined waveform patterns. Referring to FIG. 10, ideally if Ac==At1==At2, then the processor can identify the input as corresponding to waveform pattern 1000. However, in a real physical implementation although the signals may be in phase and substantially equal, minor differences can exist due to noise, impedance, etc. A more reliable check for waveform 1000 therefore follows: Ac>first threshold (to ensure a signal is present), |Ac−At1|<second threshold, and |Ac−At2|<second threshold, where the first threshold is a relatively high threshold greater than the second threshold, and the second threshold is a relatively small threshold intended to ensure a minimal differential between the compared signals. When each of these are true the processor can determine that the input corresponds to waveform pattern 1000, and therefore that the load is in an ON state. Similar reasoning and processes can be used to identify other waveform patterns.

Another viable method of identifying waveform patterns is reading and processing analog-digital converter (ADC) samples from the common line (C), traveler 1 line (T1) and traveler 2 line (T2). In the disclosed embodiments, ADC samples can be read periodically, e.g., every millisecond, to ensure an analysis of more than one entire waveform is performed.

In an implementation of the disclosed embodiments, the processor can compare the common waveform C with the waveforms seen on T1 and T2. The processor determines a difference in readings of C samples and T1 samples and a difference in readings of C samples and T2 samples. In either comparison, if the difference is smaller than a threshold (e.g., 200), then those points can be considered essentially equal (i.e, the waveforms match at those points). The processor can track a number of times that each comparison is smaller than the threshold (C-T1 difference, C-T2 difference). Waveforms that match completely (as in the waveforms shown in FIG. 10) result in 24 equal points.

Table 1 shows an example chart of how the count (C-T1 difference, C-T2 difference) and the average of common ADC samples (ComAvg) can be used in determining the waveform. In this example a 24-sample set is used to make the determination, but sample sets of different sizes can be used.

of the common signal and the first traveler signal is below a second threshold value, and determining that a differential of the common signal and the second traveler signal is below the second threshold value.

The disclosed electrical control system can determine that the waveform pattern indicates the power source is missing (e.g., power outage, corresponding to FIG. 11 waveforms) based on determining that the common signal is below a first threshold value, determining that a differential of the common signal and the first traveler signal is below a second threshold value, and determining that a differential of the common signal and the second traveler signal is below the second threshold value.

The disclosed electrical control system can determine that the waveform pattern indicates the load is in an "off" state and the electrical control system is in a downstream position relative to the corresponding switch (e.g., corresponding to FIG. 12 or 13) based on either: 1) determining that the common signal is below a first threshold value, determining that a differential of the common signal and the first traveler signal is below a second threshold value, and determining that a differential of the common signal and the second traveler signal is above a third threshold value; or 2) determining that the common signal is below the first threshold value, determining that a differential of the third signal and the first signal is above the third threshold value, and determining that a differential of the third signal and the second signal is below the second threshold value.

The disclosed electrical control system can determine that the waveform pattern indicates the load is in an "off" state and the electrical control system is in a upstream position relative to the corresponding switch (e.g., corresponding to FIG. 14 or 15) based on either: 1) determining that the common signal is above a first threshold value, determining that a differential of the common signal and the first traveler signal is below a second threshold value, and determining that a differential of the common signal and the second traveler signal is above a third threshold value, or 2) determining that the common signal is above the first

TABLE 1

| C − T1 difference (number of readings that C − T1 < 200) | C − T2 difference (number of readings that C − T2 < 200) | ComAvg (average of common ADC readings) | Description | Up/Down stream | Toggle/Dim | Reference Figure Example Waveform |
|---|---|---|---|---|---|---|
| 24 | 24 | >=200 | Load-on 100% | NA | toggle | FIG. 10 |
| 24 | 24 | <200 | Power outage | NA | NA | FIG. 11 |
| 24 | <5 | >=750 | Load-off t1 | Up (t1) | either | FIG. 14 |
| 24 | <5 | <750 | Load-off t1 | Down (t1) | either | FIG. 12 |
| <5 | 24 | >=750 | Load-off t2 | Up (t2) | either | FIG. 15 |
| <5 | 24 | <750 | Load-off t2 | Down (t2) | either | FIG. 13 |
| >=5 && <24 rest of the time, T2 > T1 | 24 | NA | Load-on dim t1 | Up (t1) | dim | FIG. 18 |
| 24 | >=5 && <24 rest of the time, T1 > T2 | NA | Load-on dim t2 | Up (t2) | dim | FIG. 19 |
| >=5 && <24 rest of the time, T1 > T2 | 24 | NA | Load-on dim t1 | Down (t1) | dim | FIG. 16 |
| 24 | >=5 && <24 rest of the time, T2 > T1 | NA | Load-on dim t2 | Down (t2) | dim | FIG. 17 |

More generally, Table 1 shows that the disclosed electrical control system can determine that the waveform pattern indicates the load is in an "on" state (e.g., corresponds to FIG. 10) based on determining that the common signal is above a first threshold value, determining that a differential threshold value, determining that a differential of the common signal and the first traveler signal is above the third threshold value, and determining that a differential of the common signal and the second traveler signal is below the second threshold value.

The disclosed electrical control system can determine that the waveform pattern indicates the load is in a partial "on" state (e.g., corresponding to one of the waveforms shown in FIGS. 16-19) based on either: 1) determining that a differential of the common signal and the first traveler signal is below a first threshold value, and determining that a differential of the common signal and the second traveler signal is below the first threshold value for a portion of the waveform and above the first threshold value for a portion of the waveform, or 2) determining that a differential of the common signal and the second traveler signal is below a first threshold value, and determining that a differential of the common signal and the first traveler signal is below the first threshold value for a portion of the waveform and above the first threshold value for a portion of the waveform.

Accordingly, the disclosed modular, smart electrical control system can automatically determine a state of a load. The disclosed electrical control system can also automatically determine an upstream/downstream installation position. Furthermore the disclosed electrical control system can replace a simple switch in a three-way or multi-way switch configuration and automatically reflect the actions of corresponding switches on a user interface.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of controlling an electrical control system in an electrical box of a premises, the electrical control system including a switch module to control power delivery from a power source to at least one load, the switch module including first and second traveler lines to connect the switch module to a load or to a corresponding switch in a multi-way configuration, comprising:
   receiving, at the switch module, a first signal from the first traveler line;
   receiving, at the switch module, a second signal from the second traveler line;
   receiving, at the switch module, a third signal from a common line, where the common line is connected to the load or the power source;
   identifying a predetermined waveform pattern based on the first signal, second signal and third signal;
   determining a state of the load based on the identified waveform pattern; and
   controlling a display of a user interface based on the determined state of the load.

2. The method of claim 1, wherein identifying the predetermined waveform pattern comprises:
   determining that the predetermined waveform pattern is a first waveform pattern that indicates the load is in an "on" state based on:
      determining that the third signal is above a first threshold value;
      determining that a differential of the third signal and the first signal is below a second threshold value; and
      determining that a differential of the third signal and the second signal is below the second threshold value.

3. The method of claim 1, wherein identifying the predetermined waveform pattern comprises:
   determining that the predetermined waveform pattern is a second waveform pattern that indicates the power source is missing (power outage) based on:
      determining that the third signal is below a first threshold value;
      determining that a differential of the third signal and the first signal is below a second threshold value; and
      determining that a differential of the third signal and the first second signal is below the second threshold value.

4. The method of claim 1, wherein identifying the predetermined waveform pattern comprises:
   determining that the predetermined waveform pattern is a third pattern that indicates the load is in an "off" state and the electrical control system is in a downstream position relative to the corresponding switch based on either:
      determining that the third signal is below a first threshold value;
      determining that a differential of the third signal and the first signal is below a second threshold value; and
      determining that a differential of the third signal and the second signal is above a third threshold value;
   or:
      determining that the third signal is below the first threshold value;
      determining that a differential of the third signal and the first signal is above the third threshold value; and
      determining that a differential of the third signal and the second signal is below the second threshold value.

5. The method of claim 1, wherein identifying the predetermined waveform pattern comprises:
   determining that the predetermined waveform pattern is a fourth pattern that indicates the load is in an "off" state and the electrical control system is in a upstream position relative to the corresponding switch based on either:
      determining that the third signal is above a first threshold value;
      determining that a differential of the third signal and the first signal is below a second threshold value; and
      determining that a differential of the third signal and the second signal is above a third threshold value;
   or:
      determining that the third signal is above the first threshold value;
      determining that a differential of the third signal and the first signal is above the third threshold value; and
      determining that a differential of the third signal and the second signal is below the second threshold value.

6. The method of claim 1, wherein identifying the predetermined waveform pattern comprises:
   determining that the predetermined waveform pattern is a fifth pattern that indicates the load is in a partial "on" state based on either:
      determining that a differential of the third signal and the first signal is below a first threshold value; and
      determining that a differential of the third signal and the second signal is below the first threshold value for a portion of the waveform and above the first threshold value for a portion of the waveform;
   or, determining that a differential of the third signal and the second signal is below a first threshold value; and determining that a differential of the third signal and the first signal is below the first threshold value for a portion of the waveform and above the first threshold value for a portion of the waveform.

7. The method of claim 1, further comprising determining a dimmer/toggle operational mode of the corresponding switch based on the identified waveform pattern.

8. The method of claim 1, further comprising determining an upstream/downstream position of the electrical control system relative to the corresponding switch based on the identified waveform pattern.

9. A modular electrical control system for installation in an electrical box of a premises, comprising:
   a switch module to control power delivery from a power source to at least one load, the switch module including first and second traveler lines to connect the switch module to a load or to a corresponding switch in a three-way configuration, the switch module including:
      a detector circuit that: 1) receives inputs from the first traveler line, the second traveler line, and a common line that is connected to either the power source or the load, 2) compares the received inputs against each other and/or respective threshold values, and 3) outputs the comparison results, and
      a processor that identifies a predetermined waveform based on the output received from the detection circuit and determines a state of the load; and
   a removable user interface module configured to connect to the switch module and receive power from the switch module,
   wherein the processor controls a display setting of the user interface module based at least in part on the determined state of the load.

10. The modular electrical control system of claim 9, wherein the processor determines an upstream/downstream position of the switch module based on voltage signals detected on the first traveler, second traveler and common lines.

11. The modular electrical control system of claim 10, wherein:
   the switch module is operable to function in a binary toggle mode or a dimmer mode,
   and the processor prevents the switch module from operating in the dimmer mode when the processor determines that the switch module is in an upstream position.

12. The modular electrical control system of claim 9, wherein the processor determines the predetermined waveform pattern is a first waveform pattern that indicates the load is in an "on" state based on:
   determining that the third signal is above a first threshold value;
   determining that a differential of the third signal and the first signal is below a second threshold value; and
   determining that a differential of the third signal and the second signal is below the second threshold value.

13. The modular electrical control system of claim 9, wherein the processor determines that the predetermined waveform pattern is a second waveform pattern that indicates the power source is missing (power outage) based on:
   determining that the third signal is below a first threshold value;
   determining that a differential of the third signal and the first signal is below a second threshold value; and
   determining that a differential of the third signal and the first second signal is below the second threshold value.

14. The modular electrical control system of claim 9, wherein the processor determines that the predetermined waveform pattern is a third pattern that indicates the load is in an "off" state and the electrical control system is in a downstream position relative to the corresponding switch based on either:
   determining that the third signal is below a first threshold value;
   determining that a differential of the third signal and the first signal is below a second threshold value; and
   determining that a differential of the third signal and the second signal is above a third threshold value;
   or:
   determining that the third signal is below the first threshold value;
   determining that a differential of the third signal and the first signal is above the third threshold value; and
   determining that a differential of the third signal and the second signal is below the second threshold value.

15. The modular electrical control system of claim 9, wherein the processor determines that the predetermined waveform pattern is a fourth pattern that indicates the load is in an "off" state and the electrical control system is in a upstream position relative to the corresponding switch based on either:
   determining that the third signal is above a first threshold value;
   determining that a differential of the third signal and the first signal is below a second threshold value; and
   determining that a differential of the third signal and the second signal is above a third threshold value;
   or:
   determining that the third signal is above the first threshold value;
   determining that a differential of the third signal and the first signal is above the third threshold value; and
   determining that a differential of the third signal and the second signal is below the second threshold value.

16. The modular electrical control system of claim 9, wherein the processor determines that the predetermined waveform pattern is a fifth pattern that indicates the load is in a partial "on" state based on either:
   determining that a differential of the third signal and the first signal is below a first threshold value; and
   determining that a differential of the third signal and the second signal is below the first threshold value for a portion of the waveform and above the first threshold value for a portion of the waveform;
   or,
   determining that a differential of the third signal and the second signal is below a first threshold value; and
   determining that a differential of the third signal and the first signal is below the first threshold value for a portion of the waveform and above the first threshold value for a portion of the waveform.

17. The modular electrical control system of claim 9, wherein the processor determines a dimmer/toggle operational mode of the corresponding switch based on the identified waveform pattern.

18. The modular electrical control system of claim 9, wherein the processor determines an upstream/downstream position of the electrical control system relative to the corresponding switch based on the identified waveform pattern.

* * * * *